United States Patent
Li et al.

(10) Patent No.: US 11,921,660 B2
(45) Date of Patent: *Mar. 5, 2024

(54) EQUALIZATION TIME CONFIGURATION METHOD, CHIP, AND COMMUNICATIONS SYSTEM

(71) Applicant: Huawei Technologies Co., Ltd., Shenzhen (CN)

(72) Inventors: Yongyao Li, Shenzhen (CN); Jiang Zhu, Shenzhen (CN); Fei Luo, Chengdu (CN); Jiankang Li, Chengdu (CN); Yulong Ma, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,271

(22) Filed: May 27, 2022

(65) Prior Publication Data

US 2022/0292035 A1    Sep. 15, 2022

Related U.S. Application Data

(63) Continuation of application No. 16/952,350, filed on Nov. 19, 2020, now Pat. No. 11,347,669, which is a (Continued)

(30) Foreign Application Priority Data

May 23, 2018   (CN) .......................... 201810503737.3

(51) Int. Cl.
*G06F 13/40*   (2006.01)
*G06F 13/362*  (2006.01)
*G06F 13/42*   (2006.01)

(52) U.S. Cl.
CPC ........ *G06F 13/362* (2013.01); *G06F 13/4022* (2013.01); *G06F 13/4221* (2013.01)

(58) Field of Classification Search
CPC . G06F 13/362; G06F 13/4022; G06F 13/4221
See application file for complete search history.

(56) References Cited

U.S. PATENT DOCUMENTS

| 2004/0184409 A1* | 9/2004 | Schoenborn ..... G01R 31/31716 370/249 |
| 2008/0123729 A1* | 5/2008 | Kobayashi ........ H04L 25/03885 375/232 |

(Continued)

FOREIGN PATENT DOCUMENTS

| CN | 101300758 A | 11/2008 |
| CN | 102637157 A | 8/2012 |

(Continued)

OTHER PUBLICATIONS

PCI Express et al., "PCI Express, Base Specification, Revision 4.0 Version 1.0," Sep. 27, 2017, 1294 pages.

*Primary Examiner* — Henry Tsai
*Assistant Examiner* — Harry Z Wang
(74) *Attorney, Agent, or Firm* — Conley Rose, P.C.

(57) ABSTRACT

An equalization time configuration method is applied to a processor system in which a Peripheral Component Interconnect Express (PCIe) bus or a Cache Coherent Interconnect for Accelerators (CCIX) bus is used. The equalization time configuration method includes determining a working physical layer (PHY) type of a master chip and a working PHY type of a slave chip, determining an equalization time of the slave chip in a fourth phase of equalization based on the working PHY type of the master chip, and determining (Continued)

an equalization time of the master chip in a third phase of the equalization based on the working PHY type of the slave chip.

20 Claims, 9 Drawing Sheets

Related U.S. Application Data continuation of application No. PCT/CN2019/070562, filed on Jan. 7, 2019.

(56) References Cited

U.S. PATENT DOCUMENTS

| | | | |
|---|---|---|---|
| 2009/0097392 A1* | 4/2009 | Diab | H04L 12/40136 370/248 |
| 2009/0220239 A1 | 9/2009 | Armstrong et al. | |
| 2013/0067127 A1* | 3/2013 | Hopgood | G06F 13/4282 710/104 |
| 2014/0092952 A1* | 4/2014 | Aguilar-Arreola | H04L 25/03878 375/233 |
| 2014/0177695 A1 | 6/2014 | Cha et al. | |
| 2014/0237301 A1* | 8/2014 | Mejia | G06F 13/4282 714/47.1 |
| 2014/0281067 A1 | 9/2014 | Das Sharma et al. | |
| 2018/0181502 A1* | 6/2018 | Jen | G06F 13/4022 |
| 2018/0285227 A1* | 10/2018 | Sharma | H04L 69/323 |
| 2018/0293196 A1* | 10/2018 | Srivastava | G06F 13/4282 |
| 2021/0073154 A1 | 3/2021 | Li et al. | |

FOREIGN PATENT DOCUMENTS

| | | |
|---|---|---|
| CN | 103885911 A | 6/2014 |
| CN | 104050138 A | 9/2014 |
| CN | 108920173 A | 11/2018 |

* cited by examiner

| Port number of a master chip | Identity of a slave chip | Channel type |
|---|---|---|
| Chip A's Port 0 | DevID 0 | SR |
| Chip A's Port 1 | DevID 1 | LR |
| Chip A's Port 1 | DevID 2 | LR |
| ... | ... | ... |

FIG. 5

| A value of bits | PHY type supported by a chip |
|---|---|
| 00 | SR |
| 01 | LR |
| 10 | SR and LR |

| Identity of a chip | PHY type supported by the chip |
|---|---|
| Chip ID0 | SR and LR |
| Chip ID1 | LR |
| Chip ID2 | LR |

EQUALIZATION TIME CONFIGURATION METHOD, CHIP, AND COMMUNICATIONS SYSTEM

CROSS-REFERENCE TO RELATED APPLICATIONS

This is a continuation of U.S. patent application Ser. No. 16/952,350 filed on Nov. 19, 2020, now U.S. Pat. No. 11,347,669, which is a continuation of International Patent Application No. PCT/CN2019/070562 filed on Jan. 7, 2019, which claims priority to Chinese Patent Application No. 201810503737.3 filed on May 23, 2018. All of the aforementioned patent applications are hereby incorporated by reference in their entireties.

TECHNICAL FIELD

The present disclosure relates to the field of chip technologies, and in particular, to an equalization time configuration method, a chip, and a communications system.

BACKGROUND

According to a provision in a Peripheral Component Interconnect Express (PCIe) bus standard or a Cache Coherent Interconnect for Accelerators (CCIX) bus standard, after a system is powered on, link negotiation is first performed, and only then is a high-speed link established for service data reception and sending. FIG. 1 shows a processor system to which a PCIe bus is applied. A link between a master chip and a slave chip is used as an example. After the system is powered on, the master chip and the slave chip first perform link negotiation, and after the negotiation is completed, establish a high-speed link for service data exchange.

It should be noted that link negotiation includes link equalization, link equalization is implemented using an equalization circuit, and a purpose of link equalization is to compensate for degradation, of a signal transmitted on a link, caused by a loss of the link. FIG. 4 shows four phases of equalization. Currently, a fixed equalization time is stipulated for each phase of equalization. For example, in a third phase (designated as phase 2), an equalization time of a slave chip is 24 milliseconds (ms), and an equalization time of a master chip is 32 ms. If the master chip (or the slave chip) does not complete a corresponding equalization operation within the stipulated equalization time, the master chip (or the slave chip) exits equalization, resulting in a failure of link negotiation between the master chip and the slave chip.

SUMMARY

This application provides an equalization time configuration method used for flexibly configuring an equalization time in order to reduce, to some extent, a quantity of link negotiation failures resulting from equalization time insufficiency. This application further provides an apparatus and a communications system that perform the method, and a chip used when the method is performed.

According to a first aspect, this application provides an equalization time configuration method. The method includes obtaining a port number of a master chip and an identity of a slave chip, and determining a type of a channel located between a port of the master chip and the slave chip, where the determined channel type is long reach (LR) or short reach (SR), obtaining a physical layer (PHY) type supported by the master chip and a PHY type supported by the slave chip, and determining whether both the PHY type supported by the master chip and the PHY type supported by the slave chip include the determined channel type, where each of the PHY type supported by the master chip and the PHY type supported by the slave chip is one of the following three: LR and SR, LR, or SR, when both the PHY type supported by the master chip and the PHY type supported by the slave chip include the determined channel type, determining working PHY types of the master chip and the slave chip, where both the working PHY types of the master chip and the slave chip are the same as the determined channel type, and configuring an equalization time of the master chip in a third phase of equalization based on the working PHY type of the slave chip, and configuring an equalization time of the slave chip in a fourth phase of the equalization based on the working PHY type of the master chip.

In this embodiment, first, the type of the channel located between the specific port of the master chip and the slave chip is determined. Then, whether both the PHY type supported by the master chip and the PHY type supported by the slave chip include the determined channel type is determined. In addition, when both the PHY type supported by the master chip and the PHY type supported by the slave chip include the determined channel type, the working PHY types of the master chip and the slave chip are determined. Both the working PHY types of the master chip and the slave chip are the same as the determined channel type. Finally, based on the working PHY type of the master chip, the equalization time of the slave chip in the fourth phase of the equalization is configured, and based on the working PHY type of the slave chip, the equalization time of the master chip in the third phase of the equalization is configured. That is, in this application, the equalization time of the slave chip in the fourth phase of the equalization is configured based on the working PHY type of the master chip, and the equalization time of the master chip in the third phase of the equalization is configured based on the working PHY type of the slave chip. Because the working PHY type of the master chip is determined, the equalization time of the slave chip in the fourth phase is configured as a relatively sufficient value. In this way, the slave chip can smoothly complete an operation in the phase, without exiting the operation because of time insufficiency. Similarly, because the working PHY type of the slave chip is determined, the equalization time of the master chip in the third phase is also configured as a relatively sufficient value. In this way, the master chip does not exit an operation in the third phase because of time insufficiency, either. It is known that in each phase of equalization, if an equalization operation of a chip cannot be completed within an equalization time, the chip exits equalization, resulting in a failure of link negotiation between the chip and a peer chip. Therefore, the method provided in this application can reduce a risk of a link negotiation failure to some extent.

It should be noted that when the chip is a master chip, the peer chip is a slave chip, and when the chip is a slave chip, the peer chip is a master chip.

Optionally, the master chip and the slave chip are connected to each other through a PCIe bus or a CCIX bus. It can be learned that the equalization time configuration method provided in this embodiment is applied to a processor system in which the PCIe bus or the CCIX bus is used.

Optionally, in the processor system to which the PCIe bus is applied, the master chip is a root complex (RC) or a switching chip, and the slave chip is an endpoint device independent of the master chip. It should be learned that the switching chip may be a master chip in some cases and may be a slave chip in other cases.

Optionally, the channel type is determined based on a loss of the channel, and a channel loss corresponding to LR is greater than a channel loss corresponding to SR.

Optionally, a PHY type supported by a chip is determined based on a channel loss that the chip is able to drive. Further, a channel loss that a chip supporting a PHY type of LR is able to drive is greater than a channel loss that a chip supporting a PHY type of SR is able to drive.

With reference to the first aspect, in a first possible implementation, configuring an equalization time of the master chip in a third phase of equalization based on the working PHY type of the slave chip is implemented in the following manner. First, an equalization circuit of the slave chip is configured based on the working PHY type of the slave chip, then, an equalization time required by the slave chip in the third phase is determined based on the equalization circuit, and finally, the equalization time of the master chip in the third phase is configured based on the equalization time required by the slave chip in the third phase.

In this embodiment, a relatively proper equalization circuit can be configured for the slave chip based on the working PHY type of the slave chip. The equalization circuit of the slave chip can balance an equalization effect and efficiency. Based on the equalization circuit of the slave chip, the equalization time required by the slave chip in the third phase of the equalization can be relatively accurately estimated. Further, based on the equalization time required by the slave chip in the third phase of the equalization, the equalization time of the master chip in the third phase of the equalization can be relatively accurately configured. That is, according to this embodiment, the equalization time of the master chip in the third phase of the equalization can be relatively accurately configured.

Optionally, for configuring an equalization circuit of the slave chip, the equalization circuit of the slave chip is configured in a manner of turning on or turning off. That is, a general equalization circuit is pre-configured within the slave chip. The equalization circuit includes at least two equalizers. The at least two equalizers may be the same or may be different. An actual working equalization circuit of the slave chip can be configured by turning on all or some of the equalizers or turning off all or some of the equalizers. It is easily learned that the equalization circuit of the slave chip in this embodiment is the actual working equalization circuit of the slave chip. The equalization circuit of the slave chip can be easily and efficiently configured using this solution.

With reference to the first aspect or the first possible implementation of the first aspect, in a second possible implementation, configuring an equalization time of the slave chip in a fourth phase of the equalization based on the working PHY type of the master chip is implemented in the following manner. First, an equalization circuit of the master chip is configured based on the working PHY type of the master chip, then, an equalization time required by the master chip in the fourth phase is determined based on the equalization circuit, and finally, the equalization time of the slave chip in the fourth phase is configured based on the equalization time required by the master chip in the fourth phase.

In this embodiment, a relatively proper equalization circuit can be configured for the master chip based on the working PHY type of the master chip. The equalization circuit of the master chip can balance an equalization effect and efficiency. Based on the equalization circuit of the master chip, the equalization time required by the master chip in the fourth phase of the equalization can be relatively accurately estimated. Further, based on the equalization time required by the master chip in the fourth phase of the equalization, the equalization time of the slave chip in the fourth phase of the equalization can be relatively accurately configured. That is, according to this embodiment, the equalization time of the slave chip in the fourth phase of the equalization can be relatively accurately configured.

Optionally, for configuring an equalization circuit of the master chip, the equalization circuit of the master chip is configured in a manner of turning on or turning off. It should be noted that a general equalization circuit is pre-configured within the master chip. The equalization circuit includes at least two equalizers. The at least two equalizers may be the same or may be different. An actual working equalization circuit of the master chip can be configured by turning on all or some of the equalizers or turning off all or some of the equalizers. It is easily learned that the equalization circuit of the master chip in this embodiment is the actual working equalization circuit of the master chip. The equalization circuit of the master chip can be easily and efficiently configured using this solution.

With reference to the first aspect, the first possible implementation of the first aspect, or the second possible implementation of the first aspect, in a third possible implementation, the equalization time of the master chip in the third phase of the equalization is configured as T1 when the working PHY type of the slave chip is SR, and the equalization time of the master chip in the third phase of the equalization is configured as T2 when the working PHY type of the slave chip is LR. It should be noted that a value of T2 is greater than a value of T1.

In this embodiment, the equalization time of the master chip in the third phase of the equalization is flexibly configured based on the working PHY type of the slave chip. Further, if the working PHY type of the slave chip is SR, the equalization time is configured as a smaller value, and if the working PHY type of the slave chip is LR, the equalization time is configured as a larger value. This not only reduces a risk of a link negotiation failure, but also increases configuration flexibility. Further, when the working PHY type of the slave chip is SR, the equalization time may be configured as a smaller value, thereby avoiding a defect that a link negotiation time is excessively long because the equalization time is excessively long.

With reference to any one of the first aspect, or the first to the third possible implementations of the first aspect, in a fourth possible implementation, if the equalization time of the slave chip in the fourth phase of the equalization is configured as T3 when the working PHY type of the master chip is SR, and the equalization time of the slave chip in the fourth phase of the equalization is configured as T4 when the working PHY type of the master chip is LR, a value of T4 is greater than a value of T3.

In this embodiment, if the working PHY type of the master chip is SR, the equalization time is configured as a smaller value, and if the working PHY type of the master chip is LR, the equalization time is configured as a larger value. This not only reduces a risk of a link negotiation failure, but also increases configuration flexibility. Further, when the working PHY type of the master chip is SR, the equalization time may be configured as a smaller value, thereby avoiding a defect that a link negotiation time is excessively long because the equalization time is excessively long.

With reference to any one of the first aspect, or the third or the fourth possible implementation of the first aspect, in a fifth possible implementation, when both the working PHY types of the master chip and the slave chip are SR, both the equalization time of the master chip in the third phase of the equalization and the equalization time of the slave chip in the fourth phase of the equalization are configured as a default value, or when both the working PHY types of the master chip and the slave chip are LR, an equalization time of the slave chip in the third phase is read, and the equalization time is written into the master chip, to use the equalization time as the equalization time of the master chip in the third phase of the equalization, and an equalization time of the master chip in the fourth phase is read, and the equalization time is written into the slave chip, to use the equalization time as the equalization time of the slave chip in the fourth phase of the equalization.

With reference to any one of the first aspect, or the third or the fourth possible implementation of the first aspect, in a sixth possible implementation, when both the working PHY types of the master chip and the slave chip are SR, an equalization time of the slave chip in the third phase is read, and the equalization time is written into the master chip, to use the equalization time as the equalization time of the master chip in the third phase of the equalization, and an equalization time of the master chip in the fourth phase is read, and the equalization time is written into the slave chip, to use the equalization time as the equalization time of the slave chip in the fourth phase of the equalization, or when both the working PHY types of the master chip and the slave chip are LR, both the equalization time of the master chip in the third phase of the equalization and the equalization time of the slave chip in the fourth phase of the equalization are configured as a default value.

Both the foregoing two embodiments provide a method for configuring the equalization time of the master chip in the third phase of the equalization and the equalization time of the slave chip in the fourth phase of the equalization based on the working PHY types of the master chip and the slave chip. The default values are set by a person skilled in the art based on a related standard or experience.

With reference to any one of the first aspect, or the first to the sixth possible implementations of the first aspect, in a seventh possible implementation, the PHY type supported by the master chip is pre-stored in a register of the master chip, and the PHY type supported by the slave chip is pre-stored in a register of the slave chip. When being used, the PHY type supported by the master chip or the PHY type supported by the slave chip may be directly read from the register of the corresponding chip in order to save time.

According to a second aspect, this application provides an equalization time configuration apparatus. The apparatus is adapted to perform the method according to any one of the first aspect or the implementations of the first aspect. The apparatus includes a transceiver and a manager.

The transceiver is adapted to receive a port number of a master chip and an identity of a slave chip. Correspondingly, the manager is adapted to determine, based on the port number of the master chip and the identity of the slave chip and by searching a channel type table, a type of a channel located between a port of the master chip and the slave chip. The determined channel type is LR or SR.

The transceiver is further adapted to receive PHY types supported by the master chip and the slave chip. Each of the PHY type supported by the master chip and the PHY type supported by the slave chip is one of the following three: LR and SR, LR, or SR. Correspondingly, the manager is further adapted to determine whether both the PHY type supported by the master chip and the PHY type supported by the slave chip include the determined channel type, and when both the PHY type supported by the master chip and the PHY type supported by the slave chip include the determined channel type, determine a working PHY type of the master chip and a working PHY type of the slave chip. It should be noted that both the working PHY types of the master chip and the slave chip are the same as the determined channel type.

Further, the manager is further adapted to configure an equalization time of the master chip in a third phase of equalization based on the working PHY type of the slave chip, and configure an equalization time of the slave chip in a fourth phase of the equalization based on the working PHY type of the master chip.

The equalization time configuration method according to any one of the first aspect or the possible implementations of the first aspect can be implemented using the apparatus provided in this embodiment. It can be learned that when the apparatus provided in this embodiment is used, the equalization time of the master chip in the third phase of the equalization can be made sufficient, and correspondingly, the master chip does not exit an equalization operation in the third phase because of time insufficiency, and the equalization time of the slave chip in the fourth phase of the equalization is also made sufficient, and correspondingly, the slave chip does not exit an equalization operation in the fourth phase because of time insufficiency. Therefore, a risk of a link negotiation failure that occurs because a chip exits an equalization operation because of equalization time insufficiency can be reduced to some extent using the apparatus provided in this embodiment.

With reference to the second aspect, in a first possible implementation, the manager is adapted to configure the equalization time of the master chip in the third phase of the equalization based on an equalization time required by the slave chip in the third phase of the equalization. The equalization time required by the slave chip in the third phase of the equalization is determined by the slave chip based on an equalization circuit of the slave chip. The equalization circuit of the slave chip is configured by the slave chip based on the working PHY type of the slave chip. The equalization time of the master chip in the third phase of the equalization can be relatively accurately configured using the apparatus provided in this embodiment.

Optionally, the equalization circuit of the slave chip is configured by the slave chip in a manner of turning on or turning off, based on the working PHY type of the slave chip. For beneficial effects of this solution, refer to beneficial effects corresponding to a related implementation of the first aspect, and details are not described herein again.

With reference to the second aspect or the first possible implementation of the second aspect, in a second possible implementation, the manager is adapted to configure the equalization time of the slave chip in the fourth phase of the equalization based on an equalization time required by the master chip in the fourth phase of the equalization. The equalization time required by the master chip in the fourth phase of the equalization is determined by the master chip based on an equalization circuit of the master chip. The equalization circuit of the master chip is configured by the master chip based on the working PHY type of the master chip. The equalization time of the slave chip in the fourth phase of the equalization can be relatively accurately configured using the apparatus provided in this embodiment.

Optionally, the equalization circuit of the master chip is configured by the master chip in a manner of turning on or turning off, based on the working PHY type of the master chip. For beneficial effects of this solution, refer to beneficial effects corresponding to a related implementation of the first aspect, and details are not described herein again.

With reference to the second aspect, in a third possible implementation, when both the working PHY types of the master chip and the slave chip are SR, the manager is adapted to configure both the equalization time of the master chip in the third phase of the equalization and the equalization time of the slave chip in the fourth phase of the equalization as a default value, or when both the working PHY types of the master chip and the slave chip are LR, the manager is adapted to read an equalization time of the slave chip in the third phase of the equalization, and write the equalization time into the master chip, to use the equalization time as the equalization time of the master chip in the third phase of the equalization, and read an equalization time of the master chip in the fourth phase of the equalization, and write the equalization time into the slave chip, to use the equalization time as the equalization time of the slave chip in the fourth phase of the equalization.

With reference to the second aspect, in a fourth possible implementation, when both the working PHY types of the master chip and the slave chip are SR, the manager is adapted to read an equalization time of the slave chip in the third phase of the equalization, and write the equalization time into the master chip, to use the equalization time as the equalization time of the master chip in the third phase of the equalization, and read an equalization time of the master chip in the fourth phase of the equalization, and write the equalization time into the slave chip, to use the equalization time as the equalization time of the slave chip in the fourth phase of the equalization, or when both the working PHY types of the master chip and the slave chip are LR, the manager is adapted to configure both the equalization time of the master chip in the third phase of the equalization and the equalization time of the slave chip in the fourth phase of the equalization as a default value.

As described above, the default values in the foregoing two embodiments are set by a person skilled in the art based on a related standard or experience.

According to a third aspect, this application provides another equalization time configuration apparatus. The apparatus is also adapted to perform the equalization time configuration method according to any one of the first aspect or the implementations of the first aspect. The apparatus includes an obtaining unit, a determining unit, and a configuration unit.

The obtaining unit is adapted to obtain a port number of a master chip and an identity of a slave chip. Correspondingly, the determining unit is adapted to determine, by searching a channel type table, a type of a channel located between a port of the master chip and the slave chip. The determined channel type is LR or SR.

The obtaining unit is further adapted to obtain a PHY type supported by the master chip and a PHY type supported by the slave chip. Each of the PHY type supported by the master chip and the PHY type supported by the slave chip is one of the following three: LR and SR, LR, or SR. Correspondingly, the determining unit is further adapted to determine, based on the PHY type supported by the master chip and the PHY type supported by the slave chip, whether both the PHY type supported by the master chip and the PHY type supported by the slave chip include the determined channel type.

When both the PHY type supported by the master chip and the PHY type supported by the slave chip include the determined channel type, the determining unit is further adapted to determine a working PHY type of the master chip and a working PHY type of the slave chip. Both the working PHY type of the master chip and the working PHY type of the slave chip are the same as the determined channel type.

The configuration unit is adapted to configure an equalization time of the master chip in a third phase of equalization based on the working PHY type of the slave chip, and configure an equalization time of the slave chip in a fourth phase of the equalization based on the working PHY type of the master chip.

The apparatus provided in this embodiment is adapted to perform the method according to any one of the first aspect or the possible implementations of the first aspect. When the apparatus provided in this embodiment is used, the equalization time of the master chip in the third phase of the equalization can be made sufficient, that is, the master chip does not exit an equalization operation in the third phase because of time insufficiency, and the equalization time of the slave chip in the fourth phase of the equalization is also made sufficient, that is, the slave chip does not exit an equalization operation in the fourth phase because of time insufficiency. Therefore, a risk of a link negotiation failure that occurs because a chip exits an equalization operation because of equalization time insufficiency can be reduced to some extent using the apparatus provided in this embodiment.

With reference to the third aspect, in a first possible implementation, the configuration unit is adapted to configure the equalization time of the master chip in the third phase of the equalization based on an equalization time required by the slave chip in the third phase of the equalization. The equalization time required by the slave chip in the third phase of the equalization is determined by the slave chip based on an equalization circuit of the slave chip. The equalization circuit of the slave chip is configured by the slave chip based on the working PHY type of the slave chip. The equalization time of the master chip in the third phase of the equalization can be relatively accurately configured using the apparatus provided in this embodiment.

Optionally, the equalization circuit of the slave chip is configured by the slave chip in a manner of turning on or turning off, based on the working PHY type of the slave chip.

With reference to the third aspect or the first possible implementation of the third aspect, in a second possible implementation, the configuration unit is adapted to configure the equalization time of the slave chip in the fourth phase of the equalization based on an equalization time required by the master chip in the fourth phase of the equalization. The equalization time required by the master chip in the fourth phase of the equalization is determined by the master chip based on an equalization circuit of the master chip. The equalization circuit of the master chip is configured by the master chip based on the working PHY type of the master chip. The equalization time of the slave chip in the fourth phase of the equalization can be relatively accurately configured using the apparatus provided in this embodiment.

Optionally, the equalization circuit of the master chip is configured by the master chip in a manner of turning on or turning off, based on the working PHY type of the master chip.

With reference to the third aspect, in a third possible implementation, when both the working PHY types of the master chip and the slave chip are SR, the configuration unit is adapted to configure both the equalization time of the master chip in the third phase of the equalization and the equalization time of the slave chip in the fourth phase of the equalization as a default value, or when both the working PHY types of the master chip and the slave chip are LR, the configuration unit is adapted to read an equalization time of the slave chip in the third phase of the equalization, and write the equalization time into the master chip, to use the equalization time as the equalization time of the master chip in the third phase of the equalization, and read an equalization time of the master chip in the fourth phase of the equalization, and write the equalization time into the slave chip, to use the equalization time as the equalization time of the slave chip in the fourth phase of the equalization.

With reference to the third aspect, in a fourth possible implementation, when both the working PHY types of the master chip and the slave chip are SR, the configuration unit is adapted to read an equalization time of the slave chip in the third phase of the equalization, and write the equalization time into the master chip, to use the equalization time as the equalization time of the master chip in the third phase of the equalization, and read an equalization time of the master chip in the fourth phase of the equalization, and write the equalization time into the slave chip, to use the equalization time as the equalization time of the slave chip in the fourth phase of the equalization, or when both the working PHY types of the master chip and the slave chip are LR, the configuration unit is adapted to configure both the equalization time of the master chip in the third phase of the equalization and the equalization time of the slave chip in the fourth phase of the equalization as a default value.

According to a fourth aspect, this application provides still another equalization time configuration apparatus. The apparatus is also adapted to perform the equalization time configuration method according to any one of the first aspect or the implementations of the first aspect. The apparatus includes a central processing unit (CPU) and a memory. The CPU is adapted to execute code stored in the memory and perform a function of the apparatus according to this embodiment.

The memory is adapted to store a channel type table. Correspondingly, the CPU is adapted to obtain a port number of a master chip and an identity of a slave chip, and then determine, based on the port number of the master chip and the identity of the slave chip and by searching the channel type table, a type of a channel located between a port of the master chip and the slave chip. The determined channel type is LR or SR.

The CPU is further adapted to obtain a PHY type supported by the master chip and a PHY type supported by the slave chip, and when both the PHY type supported by the master chip and the PHY type supported by the slave chip include the determined channel type, determine a working PHY type of the master chip and a working PHY type of the slave chip. Both the working PHY type of the master chip and the working PHY type of the slave chip are the same as the determined channel type. Each of the PHY type supported by the master chip and the PHY type supported by the slave chip is one of the following three: LR and SR, LR, or SR.

After determining the working PHY type of the master chip and the working PHY type of the slave chip, the CPU is further adapted to configure an equalization time of the slave chip in a fourth phase of equalization based on the working PHY type of the master chip, and configure an equalization time of the master chip in a third phase of the equalization based on the working PHY type of the slave chip. Similar to the apparatus according to the foregoing implementations, a risk of a link negotiation failure that occurs because a system exits an equalization operation because of equalization time insufficiency can be reduced to some extent using the apparatus according to this embodiment.

According to a fifth aspect, this application provides a chip. The chip may be the master chip or the slave chip mentioned in any one of the first aspect or the implementations of the first aspect, any one of the second aspect or the implementations of the second aspect, or any one of the third aspect or the implementations of the third aspect. The chip includes a first register, a transceiver, a second register, and a manager.

The first register is adapted to store a PHY type supported by the chip. The PHY type supported by the chip is one of the following three: LR and SR, LR, or SR.

The transceiver is adapted to send the PHY type supported by the chip and receive a working PHY type of the chip. The working PHY type of the chip is determined based on a type of a channel between the chip and another chip. Both the PHY type supported by the chip and a PHY type supported by the other chip include the determined channel type. The determined channel type is LR or SR. The working PHY type is the same as the determined channel type.

The second register is adapted to store the working PHY type of the chip.

The manager is adapted to configure an equalization circuit of the chip based on the working PHY type of the chip, and determine an equalization time of the chip based on the equalization circuit of the chip.

The method according to any one of the first aspect or the possible implementations of the first aspect can be implemented by applying the chip according to this embodiment, thereby reducing a risk of a link negotiation failure that occurs because a system exits an equalization operation because of equalization time insufficiency.

With reference to the fifth aspect, in a first possible implementation, the second register is further adapted to store the equalization time of the chip.

According to a sixth aspect, this application further provides a communications system. The communications system includes system software, a master chip, and a slave chip. The master chip and the slave chip are connected to each other through a PCIe bus or a CCIX bus.

The system software is adapted to obtain a port number of the master chip and an identity of the slave chip, and determine, by searching a channel type table, a type of a channel located between a port of the master chip and the slave chip. The determined channel type is LR or SR.

The system software is further adapted to obtain a PHY type supported by the master chip and a PHY type supported by the slave chip, and determine whether both the PHY type supported by the master chip and the PHY type supported by the slave chip include the determined channel type. Each of the PHY type supported by the master chip and the PHY type supported by the slave chip is one of the following three: LR and SR, LR, or SR.

When both the PHY type supported by the master chip and the PHY type supported by the slave chip include the determined channel type, the system software is further adapted to determine a working PHY type of the master chip and a working PHY type of the slave chip. Both the working PHY type of the master chip and the working PHY type of the slave chip are the same as the determined channel type.

After determining the working PHY types of the master chip and the slave chip, the system software is further adapted to configure an equalization time of the master chip in a third phase of equalization based on the working PHY type of the slave chip, and configure an equalization time of the slave chip in a fourth phase of the equalization based on the working PHY type of the master chip.

When the communications system provided in this embodiment is used, the equalization time of the master chip in the third phase of the equalization can be made sufficient, and correspondingly, the master chip does not exit an equalization operation in the third phase because of time insufficiency, and the equalization time of the slave chip in the fourth phase of the equalization is also made sufficient, and correspondingly, the slave chip does not exit an equalization operation in the fourth phase because of time insufficiency. Therefore, a risk of a negotiation failure that is of a link located between a chip and a peer chip and that occurs because the chip exits an equalization operation because of equalization time insufficiency can be reduced to some extent using the system provided in this embodiment.

With reference to the sixth aspect, in a first possible implementation, the system further includes a memory, the memory is adapted to store the channel type table.

With reference to the sixth aspect or the first possible implementation of the sixth aspect, in a second possible implementation, the system software is adapted to obtain the PHY type, supported by the master chip, read and sent by the master chip, and obtain the PHY type, supported by the slave chip, read and sent by the slave chip. In this embodiment, the system software does not directly read the PHY types supported by the master chip and the slave chip. The PHY type supported by the master chip is read by the master chip and sent by the master chip to the system software, and the PHY type supported by the slave chip is read by the slave chip and sent by the slave chip to the system software. In this way, the system software only needs to obtain relevant information sent by the master chip and the slave chip. Therefore, an operation of the system software is relatively simple.

Optionally, the system software directly reads the PHY type supported by the master chip and the PHY type supported by the slave chip. In this case, because the system software directly reads the PHY type supported by the master chip and the PHY type supported by the slave chip, the master chip and the slave chip do not need to perform any operation.

With reference to the sixth aspect, the first possible implementation of the sixth aspect, or the second possible implementation of the sixth aspect, in a third possible implementation, the slave chip is adapted to configure an equalization circuit of the slave chip based on the working PHY type of the slave chip, and determine, based on the equalization circuit of the slave chip, an equalization time required by the slave chip in the third phase of the equalization. The system software is adapted to configure the equalization time of the master chip in the third phase of the equalization based on the equalization time required by the slave chip in the third phase of the equalization.

With reference to the third possible implementation of the sixth aspect, in a fourth possible implementation, the slave chip is adapted to configure the equalization circuit of the slave chip in a manner of turning on or turning off, based on the working PHY type of the slave chip.

With reference to any one of the sixth aspect, or the first to the fourth possible implementations of the sixth aspect, in a fifth possible implementation, the master chip is adapted to configure an equalization circuit of the master chip based on the working PHY type of the master chip, and determine, based on the equalization circuit of the master chip, an equalization time required by the master chip in the fourth phase of the equalization. The system software is adapted to configure the equalization time of the slave chip in the fourth phase of the equalization based on the equalization time required by the master chip in the fourth phase of the equalization.

With reference to the fifth possible implementation of the sixth aspect, in a sixth possible implementation, the master chip is adapted to configure the equalization circuit of the master chip in a manner of turning on or turning off, based on the working PHY type of the master chip.

With reference to any one of the sixth aspect, or the first or the second possible implementation of the sixth aspect, in a seventh possible implementation, when both the working PHY types of the master chip and the slave chip are SR, the system software is adapted to configure both the equalization time of the master chip in the third phase of the equalization and the equalization time of the slave chip in the fourth phase of the equalization as a default value, or when both the working PHY types of the master chip and the slave chip are LR, the system software is adapted to read an equalization time of the slave chip in the third phase of the equalization, and write the equalization time into the master chip, to use the equalization time as the equalization time of the master chip in the third phase of the equalization, and read an equalization time of the master chip in the fourth phase of the equalization, and write the equalization time into the slave chip, to use the equalization time as the equalization time of the slave chip in the fourth phase of the equalization.

With reference to any one of the sixth aspect, or the first or the second possible implementation of the sixth aspect, in an eighth possible implementation, when both the working PHY types of the master chip and the slave chip are SR, the system software is adapted to read an equalization time of the slave chip in the third phase of the equalization, and write the equalization time into the master chip, to use the equalization time as the equalization time of the master chip in the third phase of the equalization, and read an equalization time of the master chip in the fourth phase of the equalization, and write the equalization time into the slave chip, to use the equalization time as the equalization time of the slave chip in the fourth phase of the equalization, or when both the working PHY types of the master chip and the slave chip are LR, the system software is adapted to configure both the equalization time of the master chip in the third phase of the equalization and the equalization time of the slave chip in the fourth phase of the equalization as a default value.

It should be noted that for beneficial effects of the sixth aspect or the possible implementations of the sixth aspect, refer to beneficial effects of the foregoing associated embodiments. Because of high similarity, details are not described herein again.

BRIEF DESCRIPTION OF DRAWINGS

FIG. 5 shows a channel type table according to this application.

DESCRIPTION OF EMBODIMENTS

PCIe is a high-speed serial computer expansion bus standard, is one of computer bus standards PCI, and follows the concept of programming and a communications standard that are of an existing PCI bus. A PCIe bus uses a high-speed serial point-to-point dual-channel high-bandwidth transmission mode. Therefore, compared with the PCI bus, the PCIe bus has a higher transmission rate. A CCIX bus is based on a same physical architecture as the PCIe bus. The physical architecture includes an electrical sublayer and a logical sublayer. In addition, the CCIX bus supports transmission rates of PCIe 1.0, PCIe 2.0, PCIe 3.0, and PCIe 4.0.

It should be noted that the PCIe/CCIX bus may be applied not only to an internal interconnection but also to an external interconnection. It should be noted that in this application, the PCIe/CCIX bus is the PCIe bus or the CCIX bus.

In the following, only a processor system to which the PCIe bus is applied (which may also be referred to as a PCIe system) is used as an example to describe the solutions in this application. It should be learned that a processor system to which the CCIX bus is applied also has a same or similar characteristic. For details, refer to the following descriptions of the processor system to which the PCIe bus is applied in order to understand the processor system to which the CCIX bus is applied. Therefore, details are not described again.

Figure 1:
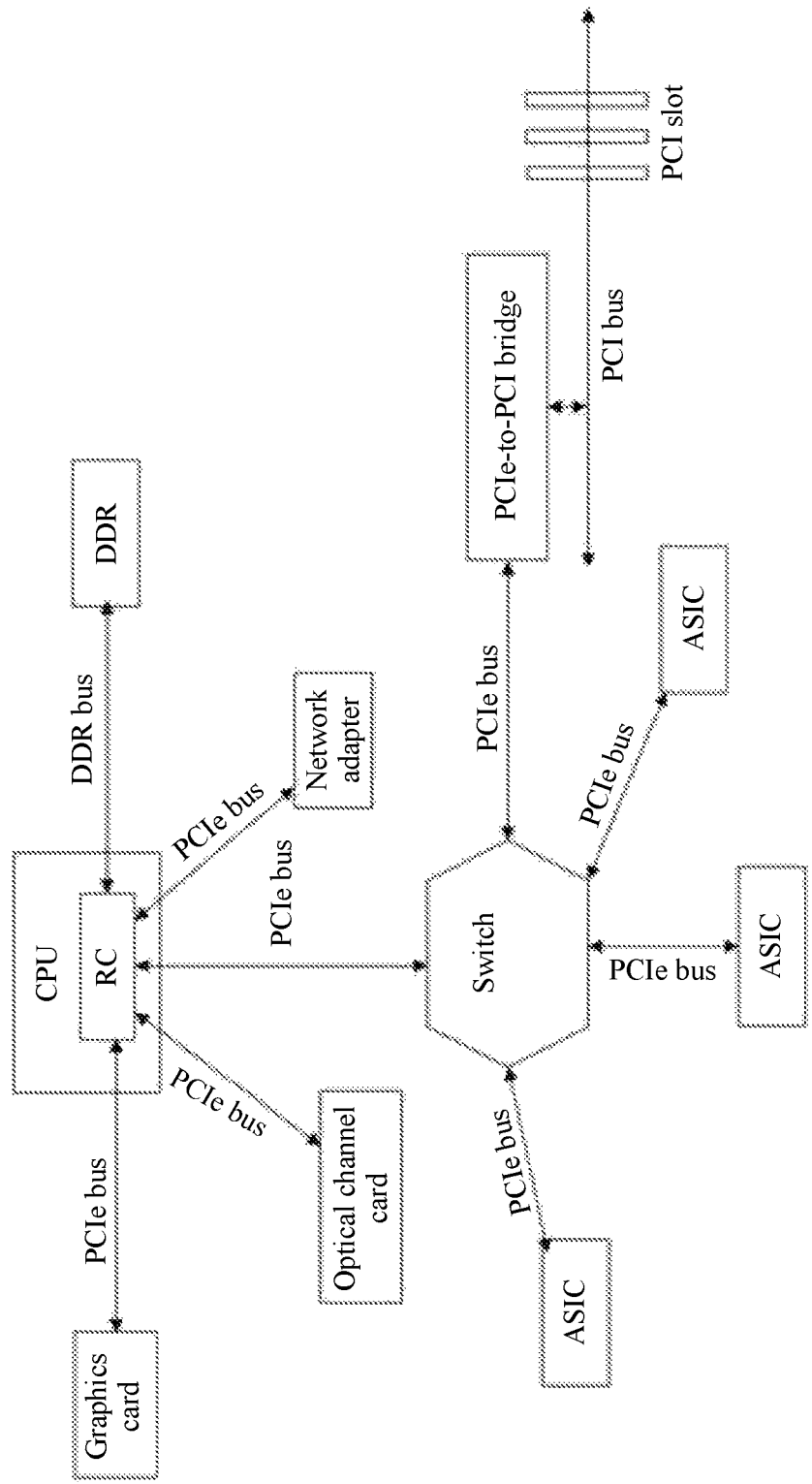
FIG. 1 is a schematic structural diagram of a processor system to which a PCIe bus is applied according to this application.

FIG. 1 shows a processor system to which a PCIe bus is applied. The system includes an RC, a switching chip, a PCIe-to-PCI bridge, and the like.

Further, the RC is also referred to as a root controller of the system, and is usually integrated on a CPU. The RC usually has a plurality of ports. Through each of the plurality of ports, the RC may be connected to one component. The plurality of ports may include a plurality of ports (PCIe ports) that are used for connecting to the PCIe bus. Through one PCIe port, the RC may be connected to one endpoint. Naturally, the RC and the endpoint are connected to each other through the PCIe bus. It should be noted that as shown in FIG. 1, the endpoint may be a graphics card, a network adapter, an optical channel card, a switch, an application-specific integrated circuit (ASIC), or the like. In the processor system shown in FIG. 1, the RC and a double data rate (DDR) are connected to each other through a DDR bus. Therefore, a port that is on the RC and that is connected to the DDR is not a PCIe port. Therefore, all or some of the plurality of ports of the RC may be PCIe ports.

The switch is adapted to perform link extension for the RC. Further, the switch and the RC are connected to each other through the PCIe bus, in addition, the switch has a plurality of ports, and through one port, the switch may be connected to one EP through the PCIe bus. Therefore, based on the switch, the RC may be connected to a plurality of endpoints through one port. As shown in FIG. 1, the switch has three ports, and through any one of the three ports, the switch may be connected to one ASIC through the PCIe bus.

The PCIe-to-PCI bridge is used for bridging, and is adapted to implement conversion between the PCIe bus and a PCI bus, thereby implementing compatibility with an original endpoint that supports the PCI bus. As shown in FIG. 1, one end of the PCIe-to-PCI bridge is connected to the switch through the PCIe bus, and the other end of the PCIe-to-PCI bridge is connected to the PCI bus. FIG. 1 further shows a plurality of PCI slots that support a PCI bus standard. A chip or card inserted in the PCI slot can be connected to the PCIe-to-PCI bridge through the PCI bus, and be further connected to the CPU through the switch.

Figure 2:
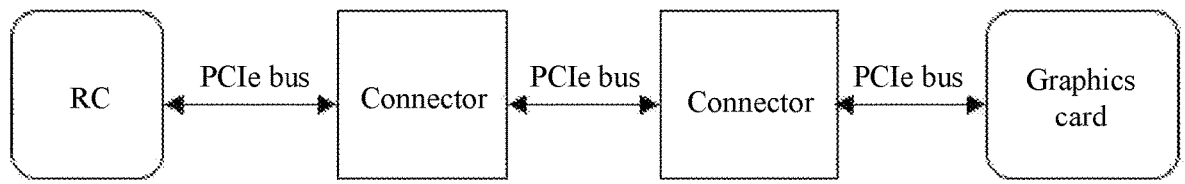
FIG. 2 is a schematic diagram of a signal channel located between an RC and a graphics card according to this application.

It should be noted that the RC and the endpoint may be directly connected through the PCIe bus, or may be connected through the PCIe bus and a connector. As shown in FIG. 2, an RC and a graphics card are connected to each other through a PCIe bus, a connector, a PCIe bus, a connector, and a PCIe bus sequentially. It should be learned that lengths of the plurality of PCIe buses located between the RC and the endpoint may be the same, or may be different.

For ease of understanding, the system mentioned for a plurality of times in this application is described herein. The system described in this application is a system (referred to as a PCIe/CCIX system) to which a PCIe/CCIX bus is applied. The PCIe/CCIX system may include one CPU and a peripheral device of the CPU. At least one of channels between the CPU and the peripheral device of the CPU uses the PCIe/CCIX bus. The PCIe/CCIX system may alternatively include a plurality of CPUs and peripheral devices of the CPUs. At least one of channels between the plurality of CPUs uses the PCIe/CCIX bus, or at least one of channels between one of the plurality of CPUs and a peripheral device uses the PCIe/CCIX bus.

Figure 3:
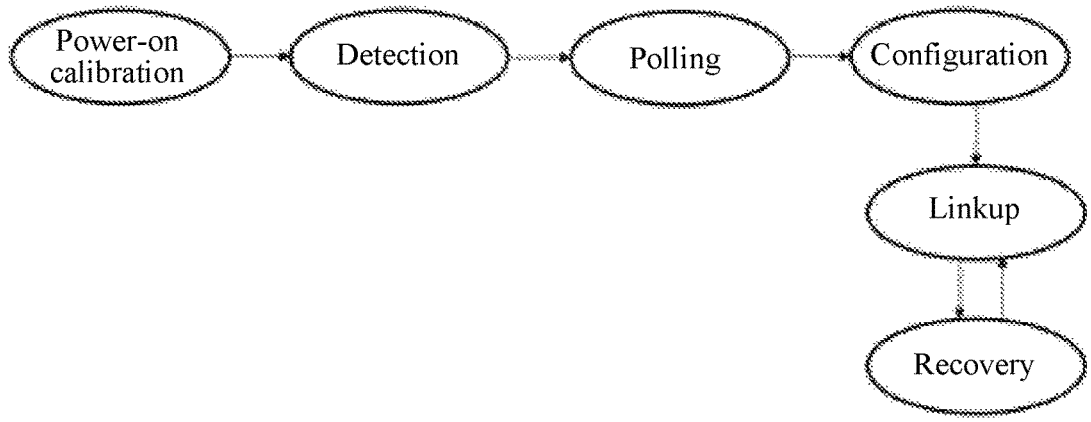
FIG. 3 is a flowchart of link establishment stipulated in a PCIe standard.

FIG. 3 is a flowchart of a PCIe system from power-on to communications connection establishment. According to a provision in a PCIe standard, after the PCIe system is started up or is reset, a link state machine in a master chip controls a link to sequentially enter the following phases: detection, polling, configuration, linkup, and recovery. Further, in the detection phase, the master chip detects whether a slave chip is in position. After it is detected that the slave chip is in position, the system enters the polling phase, in this phase, bit and symbol locking and channel polarity determining are performed. Then, the system enters the configuration phase, in this phase, a link bandwidth and a link number are determined, and channel-to-channel phase compensation and the like are performed. After configuration is completed, the system enters the linkup phase, in this phase, the link runs to linkup at a low speed, that is, the master chip and the slave chip establish a connection. Then, the system enters the recovery phase and performs equalization and speed changing. After the speed changing is completed and a rate is improved to a high speed, the system returns to the linkup state in order to transmit service data.

It should be noted that the master chip described in this application is a chip including a downstream port (DSP), and sometimes, the master chip is also referred to as a DSP, and the slave chip described in this application is a chip including an upstream port (USP), and sometimes, the slave chip is also referred to as a USP.

Further, it may be learned with reference to FIG. 1 that in this application, the master chip may be an RC, or may be a switching chip. When the master chip is an RC, the slave chip may be an endpoint device, or may be a switching chip. When the master chip is a switching chip, the slave chip may be an endpoint device. The endpoint device may be a graphics card, a network adapter, an optical channel card, a memory card, a switching chip, or the like.

Figure 4:
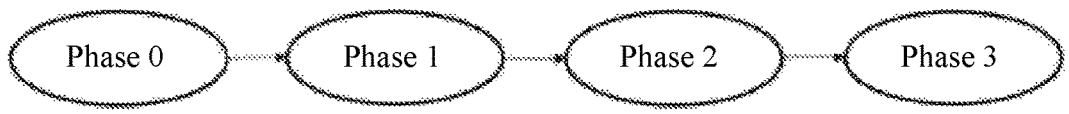
FIG. 4 is a flowchart of four phases of equalization.

It should be noted that a purpose of the equalization performed in the foregoing recovery phase is to stably increase a link rate in order to implement rate changing. For ease of understanding, equalization is described herein. In a communications system, because of existence of various types of noise and interference, a transmission signal in the communications system is distorted. That is, a channel is a non-ideal channel. A technology used for compensating for and correcting these characteristics in the channel is referred to as equalization. A time required by an equalization process is an equalization time. Usually, equalization includes four phases. Referring to FIG. 4, the four phases may be a first phase (Phase 0), a second phase (Phase 1), a third phase (Phase 2), and a fourth phase (Phase 3).

It should be noted that an operation regarding the equalization time is performed between the master chip and the slave chip. In this application, the master chip and the slave chip may be located in a same processor system, or may be located in different processor systems. The master chip and the slave chip are connected to each other through a PCIe/CCIX bus. The following describes a method with reference to the RC and the endpoint in FIG. 1. The RC in FIG. 1 is corresponding to the master chip, and the endpoint in FIG. 1 is corresponding to the slave chip.

In the phase 0, the RC sends an initial parameter required by the endpoint to the endpoint. In an embodiment of this application, maximum staying duration of the endpoint in this phase is 12 ms.

It should be noted that in the four phases of the equalization, maximum staying duration of the RC (or the endpoint) in any of the four phases is an equalization time of the RC (or the endpoint) in the phase. For example, maximum staying duration of the RC in the phase 3 of the equalization is an equalization time of the RC in the phase 3, and maximum staying duration of the endpoint in the phase 2 of the equalization is an equalization time of the endpoint in the phase 2. In the phase 1, the RC and the endpoint perform data sending and receiving at a relatively high rate obtained through rate changing, and a specified initial parameter is used for the sending and receiving operation. Further, in this phase, the RC first sends data to the endpoint. After receiving the data, the endpoint stays for a while, and after determining that a bit error rate of the data is less than 10E-4, the endpoint enters a next phase, namely, the phase 2. Before the endpoint enters the next phase, the endpoint feeds back a piece of information to the RC to indicate that the endpoint is to enter the next phase. The RC also enters the next phase after receiving the information. Optionally, maximum staying duration of the endpoint in the phase 1 is 12 ms, and maximum staying duration of the RC in the phase 1 is 24 ms.

In the phase 2, the endpoint adjusts a transmit (Tx) parameter of the RC, and correspondingly, adjusts a receive (Rx) parameter of the endpoint, to expect that a bit error rate of a link between the endpoint and the RC is less than 10E-12. It should be learned that if the bit error rate between the endpoint and the RC does not meet the foregoing requirement, the endpoint repeats the foregoing adjustment operation, and after the bit error rate of the link is less than 10E-12, both the endpoint and the RC enter a next phase, namely, the phase 3. Optionally, in this phase, maximum staying duration of the RC is 32 ms, and maximum staying duration of the endpoint is 24 ms.

In the phase 3, the RC adjusts a Tx parameter of the endpoint, and correspondingly, adjusts an Rx parameter of the RC, to expect that the bit error rate of the link between the endpoint and the RC is less than 10E-12. It should be learned that if the bit error rate between the endpoint and the RC is not less than 10E-12, the RC repeats the foregoing adjustment operation, and after the bit error rate of the link is less than 10E-12, the phase 3 ends. At this point, equalization time negotiation also ends. In a normal case, a link rate increases to a higher-level rate. That is, the link reaches a high-speed linkup state.

It should be noted that the foregoing operation regarding the equalization time not only may be performed in the recovery phase, but also may be performed after the chip is powered on and before a PCIe/CCIX state machine is started up.

In an equalization time negotiation method provided in this application, a time required in the phase 2 and a time required in the phase 3 are negotiated.

Before the method described in this application is performed, the following configuration further needs to be performed on the PCIe system.

First, a channel type table shown in FIG. 5 needs to be set up and stored in the PCIe system. The channel type table includes at least a port number of a master chip, an identity of a slave chip, and a channel type. It should be noted that the port number of the master chip can uniquely identify a particular port of a particular master chip, and the identity of the slave chip can uniquely identify a particular slave chip. Based on the port number of the master chip and the identity of the slave chip, a type of a channel located between the port of the master chip and the slave chip can be uniquely determined.

It should be noted that after the channel type table is stored in the PCIe system, none of powering on, powering off, and resetting of the system results in loss of the channel type table. Further, the channel type table is stored in a memory in the PCIe system.

In this application, channel types include LR and SR. This classification is determined based on a magnitude of a channel loss. It should be clarified that a channel loss corresponding to LR is greater than a channel loss corresponding to SR. Optionally, the channel loss corresponding to LR is greater than or equal to 22 decibels (dB) and is less than 32 dB, and the channel loss corresponding to SR is less than 22 dB.

In this application, the channel type is related to the magnitude of the channel loss. It should be learned that the channel type may be further related to a parameter in another dimension, for example, a channel bandwidth magnitude or whether a working time period of a channel is idle hours or busy hours. Further, in this application, the channel types are divided into LR and SR based on the magnitude of the channel loss. It should be learned that the channel types may be alternatively divided at a smaller granularity. For example, the channel types may be divided into LR, middle reach (MR), and SR, or may be divided into extra LR (XLR), LR, MR, SR, and extra SR (XSR).

Second, a PHY type supported by a master chip and a PHY type supported by a slave chip need to be further pre-configured. Further, a PHY type supported by a chip is related to a magnitude of a channel loss that the chip is able to drive. In this application, the PHY type supported by the master chip may be only LR, may be only SR, or may be both LR and SR. Similarly, the PHY type supported by the slave chip may be only LR, may be only SR, or may be both LR and SR. It should be noted that a channel loss that a chip supporting a PHY type of LR is able to drive is greater than a channel loss that a chip supporting a PHY type of SR is able to drive.

It should be noted that in this application, a PHY type supported by a chip is stored in a register of the chip. Further, the PHY type supported by the master chip is stored in a register of the master chip, and the PHY type supported by the slave chip is stored in a register of the slave chip.

Optionally, a PHY type supported by a chip may be further related to power consumption, costs, an application scenario, and the like of the chip.

It may be learned with reference to the foregoing descriptions that assuming that the type of the channel located between the port of the master chip and the slave chip is located in a set Q, the PHY type supported by the master chip or the PHY type supported by the slave chip is a subset or universal set of the set Q. For example, in this application, the set Q includes LR and SR, and the PHY type supported by the master chip may be only LR, only SR, or both LR and SR, and the PHY type supported by the slave chip may also be only LR, only SR, or both LR and SR.

After the foregoing configuration is completed and the system is powered on, an equalization time configuration method provided in this application is performed. The method may be performed by system software or a management chip of the system. The system software may be a basic input/output system (BIOS). It should be learned that the BIOS is the first software loaded after a device is powered on, and after being loaded, the BIOS guides an upper-layer operating system (OS) to boot. In a running phase of the BIOS, the BIOS may perform the equalization time configuration method provided in this application.

Figure 6:
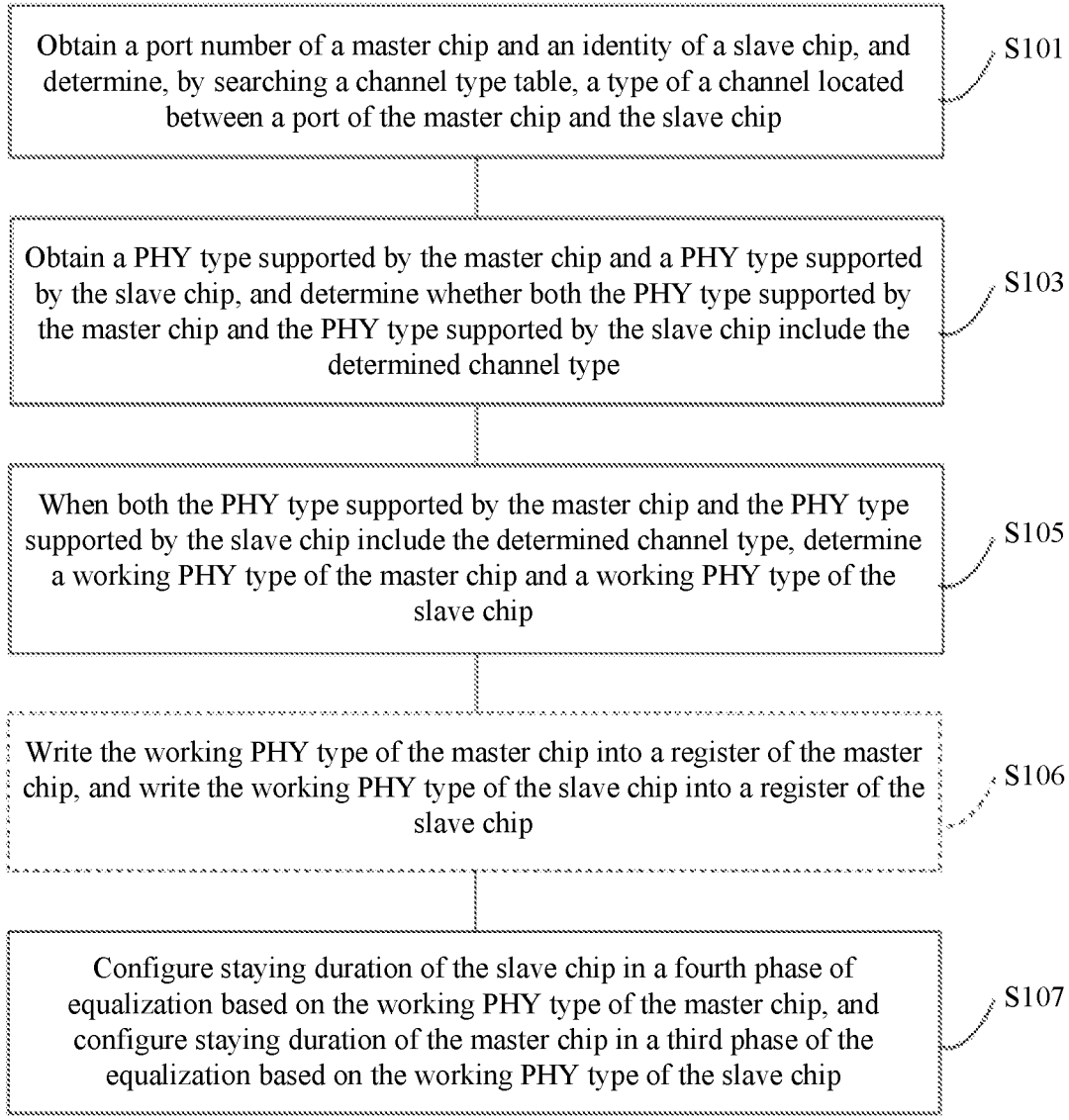
FIG. 6 is a flowchart of an equalization time configuration method according to this application.

As shown in FIG. 6, the method provided in this application includes the following steps.

S101: Obtain a port number of a master chip and an identity of a slave chip, and determine, by searching a channel type table, a type of a channel located between a port of the master chip and the slave chip.

The determined channel type is LR or SR.

The channel type table is pre-stored in a memory of a PCIe/CCIX system. Further, the memory may be a flash memory, an electrically erasable programmable read-only memory EEPROM, or the like. As described above, the channel type table includes at least three columns: the port number of the master chip, the identity of the slave chip, and channel types. Based on the port number of the master chip and the identity of the slave chip, a type of a channel located between the master chip and the slave chip can be uniquely determined.

In this application, the channel type may be LR or SR. This classification is performed from a dimension of a channel loss. A loss of a channel of an LR type is greater than a loss of a channel of an SR type.

S103: Obtain a PHY type supported by the master chip and a PHY type supported by the slave chip, and determine whether both the PHY type supported by the master chip and the PHY type supported by the slave chip include the channel type determined in step S101.

The PHY type supported by the master chip may be only LR, only SR, or both LR and SR. The PHY type supported by the slave chip may also be only LR, only SR, or both LR and SR.

As described above, in this application, a PHY type supported by a chip is related to a magnitude of a channel loss that the chip is able to drive. It should be noted that a channel loss that a chip supporting a PHY type of LR is able to drive is greater than a channel loss that a chip supporting a PHY type of SR is able to drive.

Optionally, the system software may directly obtain the PHY type supported by the master chip and the PHY type supported by the slave chip. Alternatively, the master chip may first obtain the PHY type supported by the master chip, and then send the PHY type supported by the master chip to the system software, and the slave chip may first obtain the PHY type supported by the slave chip, and then send the PHY type supported by the slave chip to the system software.

Figures 7, 8, 9A:
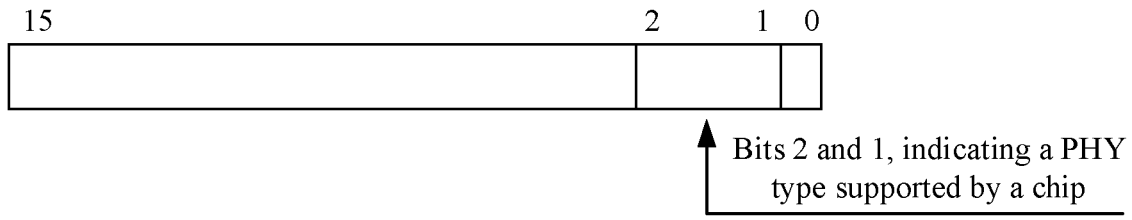
FIG. 7 shows a manner used for expressing a PHY type supported by a chip according to this application.
FIG. 8 shows a table of a correspondence between a PHY type supported by a chip and a value of a bit according to this application.
FIG. 9A shows a table of a correspondence between an identity of a chip and a PHY type supported by the chip according to this application.

It should be noted that the PHY type supported by the master chip is pre-stored in a register of the master chip. The register may be a status register. In an embodiment of this application, the PHY type supported by the master chip may be represented by at least one bit. Referring to FIG. 7, a PHY type supported by a chip is represented by two bits. The two bits are 1 and 2. A value of the two bits may be "00", "01", or "10". Further referring to FIG. 8, when a chip in FIG. 8 is the master chip in this application, it is easily learned that "00" represents that the PHY type supported by the master chip is SR, "01" represents that the PHY type supported by the master chip is LR, and "10" represents that the PHY type supported by the master chip is SR and LR.

Similarly, the PHY type supported by the slave chip is also pre-stored in a register of the slave chip. The register may be a status register. In the register, the PHY type supported by the slave chip may also be represented by at least one bit. In an embodiment of this application, the PHY type supported by the slave chip is represented by two bits. Similarly, referring to FIG. 8, when a chip in FIG. 8 is the slave chip, it is easily learned that "00" represents that the PHY type supported by the slave chip is SR, "01" represents that the PHY type supported by the slave chip is LR, and "10" represents that the PHY type supported by the slave chip is SR and LR.

The following describes in detail a meaning of both the PHY type supported by the master chip and the PHY type supported by the slave chip include the determined channel type in this application. When the determined channel type is SR, if the PHY type supported by the master chip is SR or is SR and LR, and the PHY type supported by the slave chip is SR or is SR and LR, it indicates that both the PHY types supported by the master chip and the slave chip include the determined channel type. When the determined channel type is LR, if the PHY type supported by the master chip is LR or is SR and LR, and the PHY type supported by the slave chip is LR or is SR and LR, it indicates that both the PHY types supported by the master chip and the slave chip include the determined channel type.

It should be noted that before the configuration method described in this application is performed, an identity of a chip and a PHY type supported by the chip may be stored. The chip is corresponding to the master chip and the slave chip in this application.

Further, the foregoing content may be stored in a register of a corresponding chip. Further, the foregoing content may be stored in a form of a table (as shown in FIG. 9A). The table includes at least two columns, one column indicating an identity of a chip and the other column indicating a PHY type supported by a corresponding chip. The identity of the chip may be represented by at least one bit.

S105: When both the PHY types supported by the master chip and the slave chip include the determined channel type, determine working PHY types of the master chip and the slave chip.

It should be noted that both the working PHY types of the master chip and the slave chip are the same as the determined channel type.

For example, if it is determined in step S1 that the type of the channel located between the master chip and the slave chip is SR, and it is determined in step S103 that the PHY type supported by the master chip is LR and SR and the PHY type supported by the slave chip is SR, it can be learned that both the PHY type supported by the master chip and the PHY type supported by the slave chip include the determined channel type. In this case, the working PHY type of the master chip and the working PHY type of the slave chip can be determined. Both the working PHY type of the master chip and the working PHY type of the slave chip are SR, that is, are the same as the channel type determined in step S101.

It should be noted that in this application, working PHY type of the master chip is an actual working PHY type of the master chip when service data is transferred between the master chip and the slave chip after the channel located between the port of the master chip and the slave chip is established. It should be learned that although the master chip may support one or more PHY types, the master chip supports only one working PHY type. Conventionally, the "more" means "at least two". Optionally, the "more" means "two".

Similarly, in this application, working PHY type of the slave chip is an actual working PHY type of the slave chip when service data is transferred between the master chip and the slave chip after the channel located between the port of the master chip and the slave chip is established. Although the slave chip may support one or more PHY types in this application, the slave chip supports only one working PHY type.

After the working PHY type of the master chip and the working PHY type of the slave chip are determined, the method provided this application may further include the following steps.

S106: Write the working PHY type of the master chip into the register of the master chip, and write the working PHY type of the slave chip into the register of the slave chip.

It should be noted that both the actual working PHY types of the master chip and the slave chip are the same as the channel type determined in S101. The actual working PHY types of the master chip and the slave chip are PHY types of the master chip and the slave chip when the master chip and the slave chip transmit service data.

Figure 9B:
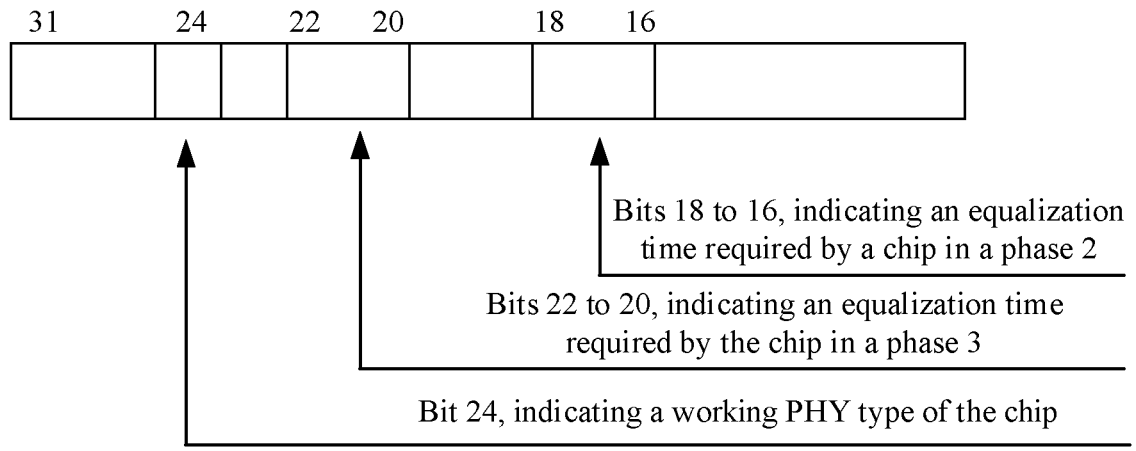
FIG. 9B shows a manner used for indicating a working PHY type of a chip according to this application.

FIG. 9B is used to indicate content stored in the register of the master chip or in the register of the slave chip. In FIG. 9B, a value of a bit 24 may be "0" or "1". The value is used to indicate the actual working PHY type of the master chip or the slave chip when service data is transmitted between the master chip and the slave chip. Further, if the value of the bit 24 is "0", it indicates that the working PHY type of the master chip or the slave chip is SR, or if the value of the bit 24 is "1", it indicates that the working PHY type of the master chip or the slave chip is LR.

After the actual working PHY types of the master chip and the slave chip are separately written into the register of the corresponding chip, the method provided in this application further includes the following step.

S107: Configure an equalization time of the master chip in a third phase of equalization based on the working PHY type of the slave chip, and configure an equalization time of the slave chip in a fourth phase of the equalization based on the working PHY type of the master chip.

It should be noted that after S107, the configuration method provided in this application may further include writing the equalization time of the master chip in the third phase of the equalization into the register of the master chip, and writing the equalization time of the slave chip in the fourth phase of the equalization into the register of the slave chip. Optionally, as shown in FIG. 9B, a value of bits 22 to 20 is used to indicate an equalization time of the chip in a fourth phase of equalization. Further, optionally, as shown in FIG. 9B, a value of bits 18 to 16 is used to indicate an equalization time of the chip in a third phase of the equalization.

It should be noted that when the working PHY type of the slave chip is determined, the slave chip configures an equalization circuit of the slave chip based on the working PHY type of the slave chip, and determines an equalization time required by the slave chip in the third phase (a phase 2) of the equalization based on the equalization circuit of the slave chip. Then, the system software configures the equalization time of the master chip in the third phase based on the equalization time required by the slave chip in the third phase of the equalization.

It is already learned based on the foregoing descriptions that the equalization time required by the slave chip in the phase 2 is related to the equalization time of the master chip in the phase 2. Therefore, the system software can further configure the equalization time of the master chip in the phase 2 based on the equalization time required by the slave chip in the phase 2. It should be learned that the equalization time required by the master chip in the phase 2, determined by the system software is greater than or equal to an actual equalization time of the master chip in the phase 2. Therefore, the master chip does not exit an equalization operation in the phase 2 because of an excessively short equalization time, thereby avoiding a failure, of link negotiation between the master chip and the slave chip, that occurs because the master chip exits the equalization operation. That is, the equalization operation of the master chip in the phase 2 can be smoothly completed.

Figure 15:
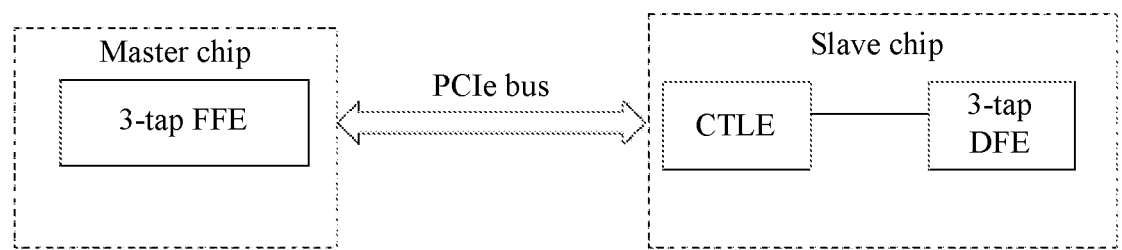
FIG. 15 is a structural diagram of a link that includes a master chip, a slave chip, and a PCIe bus between the master chip and the slave chip according to this application.

It should be noted that a general equalization circuit of the slave chip is pre-set. FIG. 15 is a logical diagram of a link that includes a master chip, a slave chip, and a PCIe bus between the master chip and the slave chip according to this application. FIG. 15 shows that a general equalization circuit of the slave chip includes a continuous time linear equalizer (CTLE) and a 3-tap decision feedback equalizer (DFE). Then, the slave chip may select an actual working equalization circuit in a manner of turning on or turning off. For example, when a working PHY type of the slave chip is LR, the actual working equalization circuit is the CTLE being connected in series to the 3-tap DFE, or when a working PHY type of the slave chip is SR, the actual working equalization circuit is only the CTLE, or the CTLE being connected in series to a 1-tap DFE. Therefore, that the slave chip configures an equalization circuit of the slave chip based on the working PHY type of the slave chip described above is actually that the slave chip selects the actual working equalization circuit from the general equalization circuit of the slave chip in a manner of turning on or turning off, based on the working PHY type of the slave chip.

It should be noted that if the equalization time of the master chip in the third phase is configured as T1 when the working PHY type of the slave chip is SR, and the equalization time of the master chip in the third phase is configured as T2 when the working PHY type of the slave chip is LR, a value of T2 is greater than a value of T1.

Similarly, when the working PHY type of the master chip is determined, the master chip configures an equalization circuit of the master chip based on the working PHY type of the master chip, and determines an equalization time required by the master chip in the fourth phase (a phase 3) of the equalization based on the equalization circuit of the master chip. Then, the system software configures the equalization time of the slave chip in the fourth phase of the equalization based on the equalization time required by the master chip in the fourth phase of the equalization.

The equalization time required by the master chip in the phase 3 is related to the equalization time of the slave chip in the phase 3. Therefore, the system software can further configure the equalization time of the slave chip in the phase 3 based on the equalization time required by the master chip in the phase 3. It should be learned that the equalization time of the slave chip in the phase 3 configured by the system software is greater than or equal to actual staying duration of the slave chip in the phase 3. Therefore, the slave chip does not exit an equalization operation in the phase 3 because of an excessively short equalization time, thereby avoiding a link negotiation failure of the system that occurs because the slave chip exits the equalization operation. That is, the equalization operation of the slave chip in the phase 3 can be smoothly completed.

It should be noted that a general equalization circuit of the master chip is also pre-set. As shown in FIG. 15, a general equalization circuit of the master chip includes a 3-tap feed forward equalizer (FFE). In this case, the master chip may select an actual working equalization circuit in a manner of turning on or turning off. For example, when a working PHY type of the master chip is LR, the actual working equalization circuit is the 3-tap FFE, or when a working PHY type of the master chip is SR, the actual working equalization circuit is a 2-tap FFE or a 1-tap FFE. Therefore, that the master chip may select an actual working equalization circuit in a manner of turning on or turning off described above is that the master chip may select the actual working equalization circuit from the general equalization circuit of the master chip in a manner of turning on or turning off.

It should be noted that if the equalization time of the slave chip in the fourth phase is configured as T3 when the working PHY type of the master chip is SR, and the equalization time of the slave chip in the fourth phase is configured as T4 when the working PHY type of the master chip is LR, a value of T4 is greater than a value of T3.

In an embodiment of this application, when both the working PHY types of the master chip and the slave chip are SR, the system software configures both the equalization time of the master chip in the third phase and the equalization time of the slave chip in the fourth phase as a default value. The default value may be pre-set based on a design document of a chip manufacturer or a test performed by a chip manufacturer on a chip, or may be a general standard value in the industry, or the like.

When both the working PHY types of the master chip and the slave chip are LR, the system software reads the equalization time of the slave chip in the third phase, and writes the equalization time into the master chip, to use the equalization time as the equalization time of the master chip in the third phase, and reads the equalization time of the master chip in the fourth phase, and writes the equalization time into the slave chip, to use the equalization time as the equalization time of the slave chip in the fourth phase.

In another embodiment of this application, when both the working PHY types of the master chip and the slave chip are SR, the system software reads the equalization time of the slave chip in the third phase, and writes the equalization time into the master chip, to use the equalization time as the equalization time of the master chip in the third phase, and reads the equalization time of the master chip in the fourth phase, and writes the equalization time into the slave chip, to use the equalization time as the equalization time of the slave chip in the fourth phase.

When both the working PHY types of the master chip and the slave chip are LR, the system software configures both the equalization time of the master chip in the third phase and the equalization time of the slave chip in the fourth phase as a default value. Similarly, the default value may be pre-set based on a design document of a chip manufacturer or a test performed by a chip manufacturer on a chip, or may be a general standard value in the industry, or the like.

In still another embodiment of this application, corresponding to the working PHY type of the slave chip, the equalization time of the master chip in the third phase has a reference value, and corresponding to the working PHY type of the master chip, the equalization time of the slave chip in the fourth phase also has a reference value. These reference values may be from a design document of a chip manufacturer or a test performed by a chip manufacturer on a chip, or may be a general standard value in the industry, or the like.

It should be learned that after the foregoing equalization time configuration is completed, a link state machine completes link establishment based on a process shown in FIG. 3, in accordance with a negotiation procedure stipulated in a PCIe bus standard.

This application further provides an equalization time configuration apparatus. The apparatus may be adapted to perform the foregoing equalization time configuration method. Therefore, for the apparatus described in this embodiment, refer to a related limitation and description of the foregoing method embodiment. For brevity, a same or similar part is not described in this embodiment again. It should be noted that the apparatus described in this embodiment may be a management chip of a system.

Figure 10:
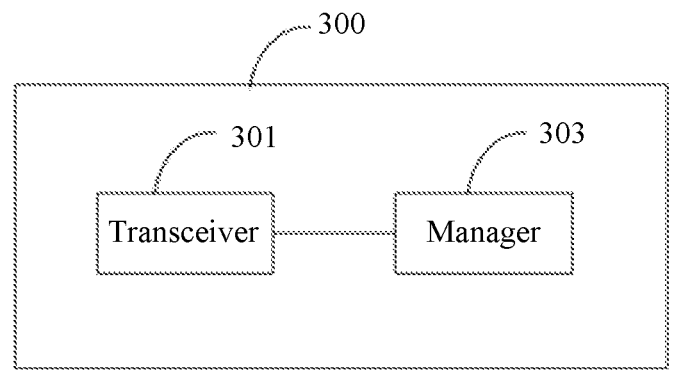
FIG. 10 is a schematic diagram of an equalization time configuration apparatus according to this application.

FIG. 10 shows an equalization time configuration apparatus 300 provided in this embodiment. The apparatus 300 includes a transceiver 301 and a manager 303.

Further, the transceiver 301 is adapted to receive a port number of a master chip and an identity of a slave chip. Correspondingly, the manager 303 is adapted to determine, based on the port number of the master chip and the identity of the slave chip and by searching a channel type table, a type of a channel located between a port of the master chip and the slave chip. In this embodiment, the determined channel type is LR or SR.

It should be noted that the port number of the master chip received by the transceiver 301 may be sent by the master chip, and the identity of the slave chip received by the transceiver 301 may be sent by the slave chip.

The transceiver 301 is further adapted to receive a PHY type supported by the master chip and a PHY type supported by the slave chip. The PHY type supported by the master chip may be LR, SR, or LR and SR. The PHY type supported by the slave chip may be LR, SR, or LR and SR. Correspondingly, the manager 303 is further adapted to determine whether both the PHY type supported by the master chip and the PHY type supported by the slave chip include the determined channel type, and when both the PHY type supported by the master chip and the PHY type supported by the slave chip include the determined channel type, determine a working PHY type of the master chip and a working PHY type of the slave chip. It should be noted that both the working PHY type of the master chip and the working PHY type of the slave chip are the same as the determined channel type.

It should be noted that the PHY type that is supported by the master chip and that is received by the transceiver 301 may be sent by the master chip, and the PHY type that is supported by the slave chip and that is received by the transceiver 301 may be sent by the slave chip.

Further, the manager 303 is further adapted to configure an equalization time of the master chip in a third phase of equalization and an equalization time of the slave chip in a fourth phase of the equalization based on the working PHY type of the master chip and the working PHY type of the slave chip.

In an embodiment of this application, the slave chip configures an equalization circuit of the slave chip based on the working PHY type of the slave chip, and determines, based on the equalization circuit of the slave chip, an equalization time required by the slave chip in the third phase of the equalization. Then, the manager 303 configures the equalization time of the master chip in the third phase of the equalization based on the equalization time required by the slave chip in the third phase of the equalization.

In another embodiment of this application, the master chip configures an equalization circuit of the master chip based on the working PHY type of the master chip, and determines, based on the equalization circuit of the master chip, an equalization time required by the master chip in the fourth phase of the equalization. Then, the manager 303 configures the equalization time of the slave chip in the fourth phase of the equalization based on the equalization time required by the master chip in the fourth phase of the equalization.

In still another embodiment of this application, when both the working PHY type of the master chip and the working PHY type of the slave chip are SR, the manager 303 is adapted to configure both the equalization time of the master chip in the third phase and the equalization time of the slave chip in the fourth phase as a default value, or when both the working PHY type of the master chip and the working PHY type of the slave chip are LR, the manager 303 is adapted to read an equalization time of the slave chip in the third phase, and write the equalization time into the master chip, to use the equalization time as the equalization time of the master chip in the third phase, and read an equalization time of the master chip in the fourth phase, and write the equalization time into the slave chip, to use the equalization time as the equalization time of the slave chip in the fourth phase.

In still another embodiment of this application, when both the working PHY type of the master chip and the working PHY type of the slave chip are SR, the manager 303 is adapted to read an equalization time of the slave chip in the third phase, and write the equalization time into the master chip, to use the equalization time as the equalization time of the master chip in the third phase, and read an equalization time of the master chip in the fourth phase, and write the equalization time into the slave chip, to use the equalization time as the equalization time of the slave chip in the fourth phase, or when both the working PHY type of the master chip and the working PHY type of the slave chip are LR, the manager 303 is adapted to configure both the equalization time of the master chip in the third phase and the equalization time of the slave chip in the fourth phase as a default value.

This application further provides a second equalization time configuration apparatus. The apparatus may also be adapted to perform the foregoing equalization time configuration method. Therefore, for the apparatus described in this embodiment, refer to a related limitation and description of the foregoing method embodiment. It should be noted that the apparatus described in this embodiment may be a BIOS.

Figure 11:
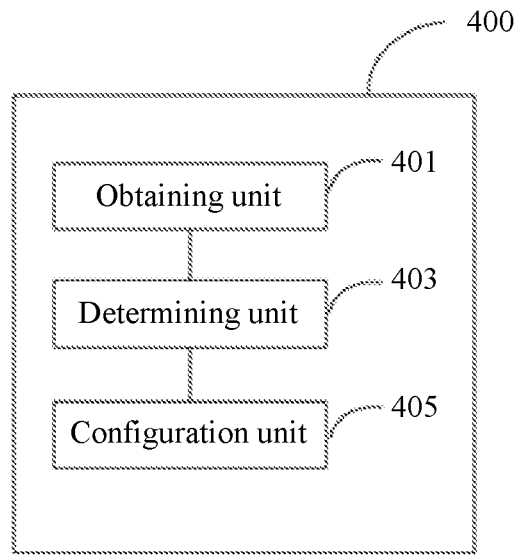
FIG. 11 is a schematic diagram of another equalization time configuration apparatus according to this application.

FIG. 11 shows an equalization time configuration apparatus 400 provided in this embodiment. The apparatus 400 includes an obtaining unit 401, a determining unit 403, and a configuration unit 405.

The obtaining unit 401 is adapted to obtain a port number of a master chip and an identity of a slave chip. Correspondingly, the determining unit 403 is adapted to determine, by searching a channel type table, a type of a channel located between a port of the master chip and the slave chip. In this embodiment, the determined channel type is LR or SR.

The obtaining unit 401 is further adapted to obtain a PHY type supported by the master chip and a PHY type supported by the slave chip. The PHY type supported by the master chip may be LR, SR, or LR and SR. The PHY type supported by the slave chip may also be LR, SR, or LR and SR. Correspondingly, the determining unit 403 is further adapted to determine whether both the PHY type supported by the master chip and the PHY type supported by the slave chip include the determined channel type, and when both the PHY type supported by the master chip and the PHY type supported by the slave chip include the determined channel type, determine a working PHY type of the master chip and a working PHY type of the slave chip. Both the working PHY type of the master chip and the working PHY type of the slave chip are the same as the determined channel type.

Further, the configuration unit 405 is adapted to configure an equalization time of the slave chip in a fourth phase (or a phase 3) of equalization based on the working PHY type of the master chip, and configure an equalization time of the master chip in a third phase (or a phase 2) of the equalization based on the working PHY type of the slave chip.

That the configuration unit 405 configures an equalization time of the slave chip in a fourth phase (or a phase 3) of equalization based on the working PHY type of the master chip includes that the master chip configures an equalization circuit of the master chip based on the working PHY type of the master chip, and determines, based on the equalization circuit of the master chip, an equalization time required by the master chip in the fourth phase of the equalization, and then, the configuration unit 405 configures the equalization time of the slave chip in the fourth phase of the equalization based on the equalization time required by the master chip in the fourth phase of the equalization.

That the configuration unit 405 configures an equalization time of the master chip in a third phase (or a phase 2) of the equalization based on the working PHY type of the slave chip includes that the slave chip configures an equalization circuit of the slave chip based on the working PHY type of the slave chip, and determines, based on the equalization circuit of the slave chip, an equalization time required by the slave chip in the third phase of the equalization, and then, the configuration unit 405 configures the equalization time of the master chip in the third phase of the equalization based on the equalization time required by the slave chip in the third phase of the equalization.

In still another embodiment of this application, when both the working PHY type of the master chip and the working PHY type of the slave chip are SR, the configuration unit 405 is adapted to configure both the equalization time of the master chip in the third phase and the equalization time of the slave chip in the fourth phase as a default value, or when both the working PHY type of the master chip and the working PHY type of the slave chip are LR, the configuration unit 405 is adapted to read an equalization time of the slave chip in the third phase, and write the equalization time into the master chip, to use the equalization time as the equalization time of the master chip in the third phase, and read an equalization time of the master chip in the fourth phase, and write the equalization time into the slave chip, to use the equalization time as the equalization time of the slave chip in the fourth phase.

In still another embodiment of this application, when both the working PHY type of the master chip and the working PHY type of the slave chip are SR, the configuration unit 405 is adapted to read an equalization time of the slave chip in the third phase, and write the equalization time into the master chip, to use the equalization time as the equalization time of the master chip in the third phase, and read an equalization time of the master chip in the fourth phase, and write the equalization time into the slave chip, to use the equalization time as the equalization time of the slave chip in the fourth phase, or when both the working PHY type of the master chip and the working PHY type of the slave chip are LR, the configuration unit 405 is adapted to configure both the equalization time of the master chip in the third phase and the equalization time of the slave chip in the fourth phase as a default value.

Figure 12:
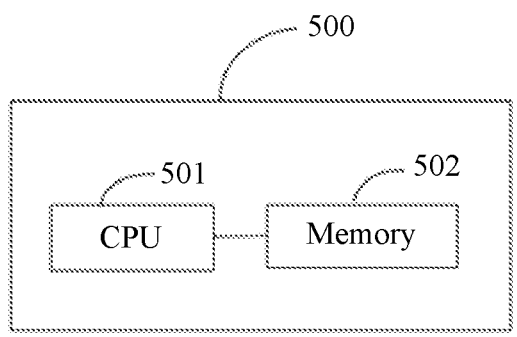
FIG. 12 is a schematic diagram of still another equalization time configuration apparatus according to this application.

This application further provides a third equalization time configuration apparatus. The apparatus may also be adapted to perform the foregoing equalization time configuration method. Correspondingly, for the apparatus, refer to a related limitation and description of the foregoing method embodiment. A same or similar part is not described in this embodiment again. FIG. 12 shows an equalization time configuration apparatus 500 provided in this embodiment. The apparatus 500 includes a CPU 501 and a memory 502. The memory 502 is adapted to store code. The CPU 501 is adapted to execute the code stored in the memory 502, to implement a function of the apparatus described in this embodiment. It should be learned that the CPU 501 is a CPU of a processor system to which a PCIe bus is applied.

The memory 502 is further adapted to store a channel type table. The CPU 501 is adapted to obtain a port number of a master chip and an identity of a slave chip, and then determine, based on the port number of the master chip and the identity of the slave chip and by searching the channel type table, a type of a channel located between a port of the master chip and the slave chip. It should be noted that the determined channel type may be LR or SR.

The CPU 501 is further adapted to obtain a PHY type supported by the master chip and a PHY type supported by the slave chip, and when both the PHY type supported by the master chip and the PHY type supported by the slave chip include the determined channel type, determine a working PHY type of the master chip and a working PHY type of the slave chip. Both the working PHY type of the master chip and the working PHY type of the slave chip are the same as the determined channel type. It should be noted that the PHY type supported by the master chip may be only LR, only SR, or LR and SR, and similarly, the PHY type supported by the slave chip may also be only LR, only SR, or LR and SR.

After determining the working PHY type of the master chip and the working PHY type of the slave chip, the CPU 501 is further adapted to configure an equalization time of the slave chip in a fourth phase of equalization based on the working PHY type of the master chip, and configure an equalization time of the master chip in a third phase of the equalization based on the working PHY type of the slave chip.

That the CPU 501 configures an equalization time of the slave chip in a fourth phase (or a phase 3) of equalization based on the working PHY type of the master chip is includes that the master chip configures an equalization circuit of the master chip based on the working PHY type of the master chip, and determines, based on the equalization circuit of the master chip, an equalization time required by the master chip in the fourth phase of the equalization, and then, the CPU 501 configures the equalization time of the slave chip in the fourth phase of the equalization based on the equalization time required by the master chip in the fourth phase of the equalization.

That the CPU 501 configures an equalization time of the master chip in a third phase (or a phase 2) of the equalization based on the working PHY type of the slave chip includes that the slave chip configures an equalization circuit of the slave chip based on the working PHY type of the slave chip, and determines, based on the equalization circuit of the slave chip, an equalization time required by the slave chip in the third phase of the equalization, and then, the CPU 501 configures the equalization time of the master chip in the third phase of the equalization based on the equalization time required by the slave chip in the third phase of the equalization.

In an implementation of this embodiment, when both the working PHY type of the master chip and the working PHY type of the slave chip are SR, the CPU 501 is adapted to configure both the equalization time of the master chip in the third phase and the equalization time of the slave chip in the fourth phase as a default value, or when both the working PHY type of the master chip and the working PHY type of the slave chip are LR, the CPU 501 is adapted to read an equalization time of the slave chip in the third phase, and write the equalization time into the master chip, to use the equalization time as the equalization time of the master chip in the third phase, and read an equalization time of the master chip in the fourth phase, and write the equalization time into the slave chip, to use the equalization time as the equalization time of the slave chip in the fourth phase.

In another implementation of this embodiment, when both the working PHY type of the master chip and the working PHY type of the slave chip are SR, the CPU 501 is adapted to read an equalization time of the slave chip in the third phase, and write the equalization time into the master chip, to use the equalization time as the equalization time of the master chip in the third phase, and read an equalization time of the master chip in the fourth phase, and write the equalization time into the slave chip, to use the equalization time as the equalization time of the slave chip in the fourth phase, or when both the working PHY type of the master chip and the working PHY type of the slave chip are LR, the CPU 501 is adapted to configure both the equalization time of the master chip in the third phase and the equalization time of the slave chip in the fourth phase as a default value.

Figure 13:
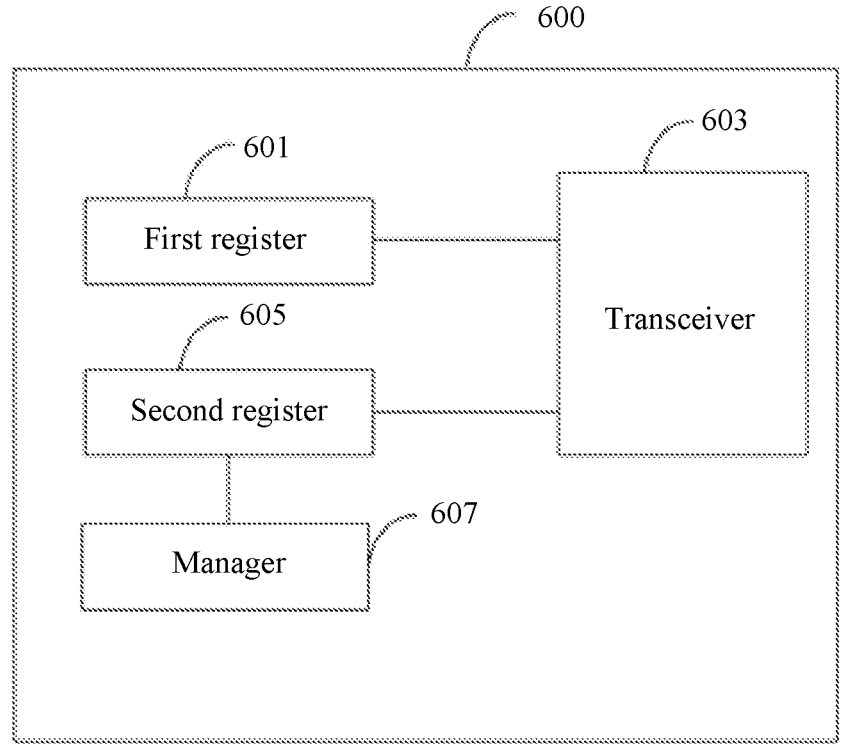
FIG. 13 is a schematic structural diagram of a chip according to this application.

This application further provides a chip. The chip is the master chip or the slave chip described in the foregoing embodiments. FIG. 13 shows a chip 600 according to this application. The chip 600 includes a first register 601, a transceiver 603, a second register 605, and a manager 607.

The first register 601 is adapted to store a PHY type supported by the chip 600. It is easily learned with reference to the foregoing descriptions that the PHY type supported by the chip 600 may be LR, SR, or LR and SR. The transceiver 603 is adapted to send the PHY type supported by the chip 600 to system software or a management chip of a system, and receive a working PHY type, of the chip 600, sent by the system software or the management chip of the system. It should be noted that the working PHY type of the chip 600 is determined based on a type of a channel between the chip 600 and another chip. Both the PHY type supported by the chip 600 and a PHY type supported by the other chip include the type of the channel between the chip 600 and the other chip, and the type of the channel between the chip 600 and the other chip may be LR or SR. It should be noted that the type of the channel between the chip 600 and the other chip is the same as the working PHY type of the chip 600.

It should be learned that when the chip 600 is the master chip described in this application, the other chip is a slave chip, and when the chip 600 is the slave chip described in this application, the other chip is a master chip.

Further, the second register 605 is further adapted to store the working PHY type of the chip 600. The manager 607 is adapted to configure an equalization circuit of the chip 600 based on the working PHY type of the chip 600, and then determine an equalization time of the chip 600 based on the equalization circuit of the chip 600. Correspondingly, the second register 605 is further adapted to store the equalization time of the chip 600.

It should be noted that the first register 601 and the second register 605 described in this embodiment may be a same register, or may be different registers. In addition, in an actual product form, a function of the first register 601 or a function of the second register 605 may be implemented by one register, or may be implemented by at least two registers. Therefore, the first register 601 and the second register 605 described in this embodiment are distinguished from a perspective of the function because the first register 601 and the second register 605 are corresponding to different functions, instead of being distinguished from a perspective of the actual product form.

Figure 14:
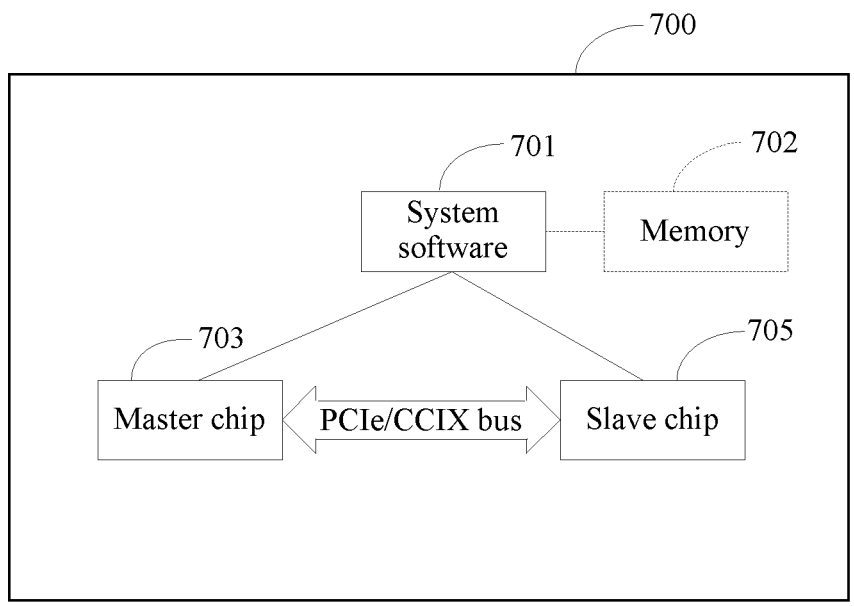
FIG. 14 is a schematic structural diagram of a communications system according to this application.

FIG. 14 shows a communications system 700 according to this application. The communications system 700 includes system software 701, a master chip 703, and a slave chip 705. The master chip 703 and the slave chip 705 are connected to each other through a PCIe/CCIX bus. It should be noted that the system software 701 may be a BIOS.

Further, the system software 701 obtains a port number of the master chip 703 and an identity of the slave chip 705, and determines, by searching a channel type table, a type of a channel located between a port of the master chip 703 and the slave chip 705. It should be learned with reference to the foregoing embodiments that the determined channel type may be LR or SR.

Further, the system software 701 obtains a PHY type supported by the master chip 703 and a PHY type supported by the slave chip 705, and determines whether both the PHY type supported by the master chip 703 and the PHY type supported by the slave chip 705 include the determined channel type.

Optionally, the system software 701 may directly read the PHY type supported by the master chip 703 and the PHY type supported by the slave chip 705.

In another implementation of this embodiment, the master chip 703 reads the PHY type supported by the master chip 703, and sends the PHY type supported by the master chip 703 to the system software 701, and the slave chip 705 reads the PHY type supported by the slave chip 705, and sends the PHY type supported by the slave chip 705 to the system software 701. That is, the PHY type that is supported by the master chip 703 and that is obtained by the system software 701 is sent by the master chip 703, and the PHY type that is supported by the slave chip 705 and that is obtained by the system software 701 is sent by the slave chip 705.

It should be learned with reference to the foregoing embodiments that the PHY type supported by the master chip 703 may be LR, SR, or LR and SR, and the PHY type supported by the slave chip 705 may also be LR, SR, or LR and SR.

When both the PHY type supported by the master chip 703 and the PHY type supported by the slave chip 705 include the determined channel type, the system software 701 determines a working PHY type of the master chip 703 and a working PHY type of the slave chip 705 based on the determined channel type. Both the working PHY type of the master chip 703 and the working PHY type of the slave chip 705 are the same as the determined channel type. When the working PHY type of the master chip 703 is determined, the system software 701 further determines an equalization time of the slave chip 705 in a fourth phase of equalization based on the working PHY type of the master chip 703. Correspondingly, when the working PHY type of the slave chip 705 is determined, the system software 701 further determines an equalization time of the master chip 703 in a third phase of the equalization based on the working PHY type of the slave chip 705.

It should be noted that the communications system 700 may further include a memory 702. The memory 702 is adapted to store the channel type table.

That the system software 701 further determines an equalization time of the slave chip 705 in a fourth phase of equalization based on the working PHY type of the master chip 703 includes that the master chip 703 configures an equalization circuit of the master chip 703 based on the working PHY type of the master chip 703, and determines, based on the equalization circuit of the master chip 703, an equalization time required by the master chip 703, and then, the system software 701 configures the equalization time of the slave chip 705 in the fourth phase of the equalization based on the equalization time required by the master chip 703 in the fourth phase of the equalization.

That the system software 701 further determines an equalization time of the master chip 703 in a third phase of the equalization based on the working PHY type of the slave chip 705 includes that the slave chip 705 configures an equalization circuit of the slave chip 705 based on the working PHY type of the slave chip 705, and determines, based on the equalization circuit of the slave chip 705, an equalization time required by the slave chip 705, and then, the system software 701 configures the equalization time of the master chip 703 in the third phase of the equalization based on the equalization time required by the slave chip 705 in the third phase of the equalization.

It should be noted that when both the working PHY type of the master chip 703 and the working PHY type of the slave chip 705 are SR, the system software 701 may configure both the equalization time of the master chip 703 in the third phase of the equalization and the equalization time of the slave chip 705 in the fourth phase of the equalization as a default value, or when both the working PHY type of the master chip 703 and the working PHY type of the slave chip 705 are LR, the system software 701 may read an equalization time of the slave chip 705 in the third phase of the equalization, and write the equalization time into the master chip 703, to use the equalization time as the equalization time of the master chip 703 in the third phase of the equalization, and read an equalization time of the master chip 703 in the fourth phase of the equalization, and write the equalization time into the slave chip 705, to use the equalization time as the equalization time of the slave chip 705 in the fourth phase of the equalization.

In another implementation of this embodiment, when both the working PHY type of the master chip 703 and the working PHY type of the slave chip 705 are SR, the system software 701 may read an equalization time of the slave chip 705 in the third phase of the equalization, and write the equalization time into the master chip 703, to use the equalization time as the equalization time of the master chip 703 in the third phase of the equalization, and read an equalization time of the master chip 703 in the fourth phase of the equalization, and write the equalization time into the slave chip 705, to use the equalization time as the equalization time of the slave chip 705 in the fourth phase of the equalization, or when both the working PHY type of the master chip 703 and the working PHY type of the slave chip 705 are LR, the system software 701 may configure both the equalization time of the master chip 703 in the third phase of the equalization and the equalization time of the slave chip 705 in the fourth phase of the equalization as a default value.

It should be noted that for all of the foregoing apparatuses, chip, and communications system, refer to related descriptions in the method embodiments. Because of singularity of subjects protected by this application, descriptions of these subjects have a plurality of same or similar parts. For brevity, in this application file, the method embodiments are comprehensively and fully described, and all the other embodiments are relatively briefly described.

It should be learned that the foregoing embodiments are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An equalization time configuration method comprising:
    obtaining a port number of a master chip and an identity of a slave chip;
    obtaining, based on the port number and the identity, a channel type of a channel between a port of the master chip and the slave chip, wherein the channel type is long reach (LR) or short reach (SR);
    obtaining a first physical layer (PHY) type supported by the master chip and a second PHY type supported by the slave chip;
    determining whether both the first PHY type and the second PHY type comprise the channel type;
    determining a first working PHY type of the master chip and a second working PHY type of the slave chip when both the first PHY type and the second PHY type comprise the channel type, wherein both the first working PHY type and the second working PHY type are the channel type;
    configuring a first equalization time of the master chip in a third phase of an equalization based on the second working PHY type; and
    configuring a second equalization time of the slave chip in a fourth phase of the equalization based on the first working PHY type.

2. The equalization time configuration method of claim 1, further comprising:
    configuring a first equalization circuit of the slave chip based on the second working PHY type;
    determining, based on the first equalization circuit, a third equalization time required by the slave chip in the third phase; and
    configuring the first equalization time based on the third equalization time.

3. The equalization time configuration method of claim 1, further comprising:
    configuring a second equalization circuit of the master chip based on the first working PHY type;
    determining, based on the second equalization circuit, a third equalization time required by the master chip in the fourth phase; and
    configuring the second equalization time based on the third equalization time.

4. The equalization time configuration method of claim 1, wherein the first equalization time is T1 when the second working PHY type is the SR, wherein the first equalization time is T2 when the second working PHY type is the LR, and wherein T2 is greater than T1.

5. The equalization time configuration method of claim 1, wherein the second equalization time is T3 when the first working PHY type is the SR, wherein the second equalization time is T4 when the first working PHY type is the LR, and wherein T4 is greater than T3.

6. The equalization time configuration method of claim 1, further comprising:
    when both the first working PHY type and the second working PHY type are the LR:
        reading a third equalization time of the slave chip in the third phase;
        writing the third equalization time into the master chip to set the third equalization time as the first equalization time;
        reading a fourth equalization time of the master chip in the fourth phase; and
        writing the fourth equalization time into the slave chip to set the fourth equalization time as the second equalization time; and
    configuring both the first equalization time and the second equalization time as a default value when both the first working PHY type and the second working PHY type are the SR.

7. The equalization time configuration method of claim 1, further comprising:
    when both the first working PHY type and the second working PHY type are SR:
        reading a third equalization time of the slave chip in the third phase;
        writing the third equalization time into the master chip to set the third equalization time as the first equalization time;
        reading a fourth equalization time of the master chip in the fourth phase; and
        writing the fourth equalization time into the slave chip to set the fourth equalization time as the second equalization time; and
    configuring both the first equalization time and the second equalization time as a default value when both the first working PHY type and the second working PHY type are the LR.

8. The equalization time configuration method of claim 1, wherein the master chip and the slave chip are coupled to each other using a Peripheral Component Interconnect Express (PCIe) bus or a Cache Coherent Interconnect for Accelerators (CCIX) bus, wherein the master chip is a root complex or a switching chip, and wherein the slave chip is an endpoint device independent of the master chip.

9. The equalization time configuration method of claim 1, further comprising obtaining the channel type based on a loss of the channel, wherein a first channel loss corresponding to the LR is greater than a second channel loss corresponding to the SR.

10. The equalization time configuration method of claim 1, wherein the first PHY type supported by the master chip is based on a first channel loss that the master chip is able to drive, wherein the second PHY type supported by the slave chip is based on a second channel loss that the slave chip is able to drive, wherein the first channel loss is greater when the first PHY type is the LR than when the first PHY type is the SR, and wherein the second channel loss is greater when the second PHY type is the LR than when the second PHY type is the SR.

11. The equalization time configuration method of claim 1, further comprising:
storing the first PHY type in a first register of the master chip; and
storing the second PHY type in a second register of the slave chip.

12. An equalization time configuration apparatus comprising:
a transceiver configured to:
receive a port number of a master chip and an identity of a slave chip; and
receive a first physical layer (PHY) type supported by the master chip and a second PHY type supported by the slave chip; and
a processor coupled to the transceiver and configured to:
determine, based on the port number and the identity, a channel type of a channel between a port of the master chip and the slave chip, wherein the channel type is long reach (LR) or short reach (SR);
determine whether both the first PHY type and the second PHY type comprise the channel type;
determine a first working PHY type of the master chip and a second working PHY type of the slave chip when both the first PHY type and the second PHY type comprise the channel type, wherein both the first working PHY type and the second working PHY type are the channel type;
configure a first equalization time of the master chip in a third phase of an equalization based on the second working PHY type; and
configure a second equalization time of the slave chip in a fourth phase of the equalization based on the first working PHY type.

13. The equalization time configuration apparatus of claim 12, wherein the processor is further configured to configure the first equalization time based on a third equalization time required by the slave chip in the third phase, wherein the third equalization time is based on a first equalization circuit of the slave chip, and wherein the first equalization circuit is based on the second working PHY type.

14. The equalization time configuration apparatus of claim 12, wherein the processor is further configured to configure the second equalization time based on a third equalization time required by the master chip in the fourth phase, wherein the third equalization time is based on a second equalization circuit of the master chip, and wherein the second equalization circuit is based on the first working PHY type.

15. The equalization time configuration apparatus of claim 12, wherein the processor is further configured to:
configure both the first equalization time and the second equalization time as a default value when both the first working PHY type and the second working PHY type are the SR; and
when both the first working PHY type and the second working PHY type are the LR:
read a third equalization time of the slave chip in the third phase;
write the third equalization time into the master chip to set the third equalization time as the first equalization time;
read a fourth equalization time of the master chip in the fourth phase; and
write the fourth equalization time into the slave chip to set the fourth equalization time as the second equalization time.

16. The equalization time configuration apparatus of claim 12, wherein the processor is further configured to:
when both the first working PHY type and the second working PHY type are the SR:
read a third equalization time of the slave chip in the third phase;
write the third equalization time into the master chip to set the third equalization time as the first equalization time;
read a fourth equalization time of the master chip in the fourth phase; and
write the fourth equalization time into the slave chip to set the fourth equalization time as the second equalization time; and
configure both the first equalization time and the second equalization time as a default value when both the first working PHY type and the second working PHY type are the LR.

17. A communications system comprising:
a master chip associated with a port number;
a bus, wherein the bus is a Peripheral Component Interconnect Express (PCIe) bus or a Cache Coherent Interconnect for Accelerators (CCIX) bus;
a slave chip associated with an identity and coupled to the master chip using the bus; and
a system software configured to:
obtain the port number and the identity;
obtain, based on the port number and the identity, a channel type of a channel between a port of the master chip and the slave chip, wherein the channel type is long reach (LR) or short reach (SR);
obtain a first physical layer (PHY) type supported by the master chip and a second PHY type supported by the slave chip;
determine whether both the first PHY type and the second PHY type comprise the channel type;
determine a first working PHY type of the master chip and a second working PHY type of the slave chip when both the first PHY type and the second PHY type comprise the channel type, wherein both the first working PHY type and the second working PHY type are the channel type;
configure a first equalization time of the master chip in a third phase of equalization based on the second working PHY type; and configure a second equalization time of the slave chip in a fourth phase of the equalization based on the first working PHY type.

18. The communications system of claim 17, wherein the slave chip comprises an equalization circuit and is configured to:
    configure the equalization circuit based on the second working PHY type; and
    determine, based on the equalization circuit, a third equalization time required by the slave chip in the third phase, and
    wherein the system software is further configured to configure the first equalization time based on the third equalization time.

19. The communications system of claim 17, wherein the master chip comprises an equalization circuit and is configured to:
    configure the equalization circuit based on the first working PHY type; and
    determine, based on the equalization circuit, a third equalization time required by the master chip in the fourth phase, and
    wherein the system software is further configured to configure the second equalization time based on the third equalization time.

20. The communications system of claim 17, wherein the slave chip comprises a first equalization circuit and is configured to:
    configure the first equalization circuit based on the second working PHY type; and
    determine, based on the first equalization circuit, a third equalization time required by the slave chip in the third phase,
    wherein the master chip comprises a second equalization circuit and is configured to:
    configure the second equalization circuit based on the first working PHY type; and
    determine, based on the second equalization circuit, a fourth equalization time required by the master chip in the fourth phase, and
    wherein the system software is further configured to:
    configure the first equalization time based on the third equalization time; and
    configure the second equalization time based on the fourth equalization time.

* * * * *